US012639003B2

(12) United States Patent
Kellam et al.

(10) Patent No.: US 12,639,003 B2
(45) Date of Patent: May 26, 2026

(54) COMPUTE ACCELERATED STACKED MEMORY

(71) Applicant: Rambus Inc., San Jose, CA (US)

(72) Inventors: Mark D. Kellam, Siler City, NC (US); Steven C. Woo, Saratoga, CA (US); Thomas Vogelsang, Mountain View, CA (US); John Eric Linstadt, Palo Alto, CA (US)

(73) Assignee: Rambus Inc., San Jose, CA (US)

( * ) Notice: Subject to any disclaimer, the term of this patent is extended or adjusted under 35 U.S.C. 154(b) by 400 days.

(21) Appl. No.: 17/627,478

(22) PCT Filed: Jul. 6, 2020

(86) PCT No.: PCT/US2020/040884
§ 371 (c)(1),
(2) Date: Jan. 14, 2022

(87) PCT Pub. No.: WO2021/015940
PCT Pub. Date: Jan. 28, 2021

(65) Prior Publication Data
US 2022/0269436 A1 Aug. 25, 2022

Related U.S. Application Data

(60) Provisional application No. 62/923,289, filed on Oct. 18, 2019, provisional application No. 62/876,488, filed on Jul. 19, 2019.

(51) Int. Cl.
*G06F 3/06* (2006.01)
*G06F 15/80* (2006.01)

(52) U.S. Cl.
CPC .......... *G06F 3/0656* (2013.01); *G06F 3/0604* (2013.01); *G06F 3/0673* (2013.01); *G06F 15/80* (2013.01)

(58) Field of Classification Search
None
See application file for complete search history.

(56) References Cited

U.S. PATENT DOCUMENTS

| | | | |
|---|---|---|---|
| 8,258,619 B2 | 9/2012 | Foster, Sr. et al. | |
| 8,310,841 B2 | 11/2012 | Foster, Sr. et al. | |
| (Continued) | | | |

FOREIGN PATENT DOCUMENTS

CN 108805795 A 11/2018

OTHER PUBLICATIONS

Gabriel H. Loh, "3-D-Stacked Memory Architectures for Multi-Core Processors", 2008, IEEE (Year: 2008).*
(Continued)

*Primary Examiner* — Hyun Nam
(74) *Attorney, Agent, or Firm* — The Neudeck Law Firm, LLC

(57) ABSTRACT

An integrated circuit that includes a set of one or more logic layers that are, when the integrated circuit is stacked in an assembly with the set of stacked memory devices, electrically coupled to a set of stacked memory devices. The set of one or more logic layers include a coupled chain of processing elements. The processing elements in the coupled chain may independently compute partial results as functions of data received, store partial results, and pass partial results directly to a next processing element in the coupled chain of processing elements. The processing elements in the chains may include interfaces that allow direct access to memory banks on one or more DRAMs in the stack. These interfaces may access DRAM memory banks via TSVs that are not used for global I/O. These interfaces allow the processing elements to have more direct access to the data in the DRAM.

20 Claims, 29 Drawing Sheets

(56) References Cited

U.S. PATENT DOCUMENTS

| | | | |
|---|---|---|---|
| 8,315,068 B2 | 11/2012 | Foster, Sr. et al. | |
| 8,432,027 B2 | 4/2013 | Foster, Sr. et al. | |
| 8,437,163 B2 | 5/2013 | Nakanishi et al. | |
| 8,493,089 B2 | 7/2013 | Cordero et al. | |
| 8,516,409 B2 | 8/2013 | Coteus et al. | |
| 8,546,955 B1 | 10/2013 | Wu | |
| 8,593,170 B2 | 11/2013 | Van der Plas et al. | |
| 8,612,687 B2* | 12/2013 | Li | G11C 8/18 |
| | | | 711/119 |
| 8,778,734 B2 | 7/2014 | Metsis | |
| 8,977,809 B2 | 3/2015 | Johnson | |
| 9,100,006 B2 | 8/2015 | Ch | |
| 9,559,086 B2 | 1/2017 | Mei et al. | |
| 10,002,653 B2 | 6/2018 | Pelley et al. | |
| 10,079,044 B2 | 9/2018 | Jayasena et al. | |
| 2002/0019843 A1 | 2/2002 | Killian et al. | |
| 2006/0184923 A1* | 8/2006 | Pires Dos Reis Moreira | |
| | | | G06F 9/5061 |
| | | | 717/140 |
| 2006/0271765 A1 | 11/2006 | Tell et al. | |
| 2008/0195848 A1 | 8/2008 | Fayad et al. | |
| 2011/0119467 A1 | 5/2011 | Cadambi et al. | |
| 2011/0296107 A1* | 12/2011 | Li | G06F 12/0895 |
| | | | 711/E12.001 |
| 2012/0256653 A1 | 10/2012 | Cordero et al. | |
| 2014/0009992 A1 | 1/2014 | Poulton | |
| 2014/0040532 A1 | 2/2014 | Watanabe et al. | |
| 2014/0085959 A1 | 3/2014 | Saraswat et al. | |
| 2014/0289445 A1* | 9/2014 | Savich | G06F 17/16 |
| | | | 710/317 |
| 2015/0106560 A1 | 4/2015 | Perego et al. | |
| 2015/0279431 A1 | 10/2015 | Li et al. | |
| 2016/0328179 A1* | 11/2016 | Quinn | G06F 12/0246 |
| 2018/0188702 A1* | 7/2018 | Jiang | G06F 9/545 |
| 2018/0210671 A1* | 7/2018 | Kowles | G06F 3/0673 |
| 2018/0322387 A1 | 11/2018 | Sridharan et al. | |
| 2019/0088339 A1 | 3/2019 | Miyashita et al. | |
| 2019/0187930 A1* | 6/2019 | Chinnakkonda | |
| | | Vidyapoornachary | G11C 5/06 |
| 2020/0081651 A1* | 3/2020 | Aga | G06F 3/0679 |
| 2020/0210296 A1* | 7/2020 | Kang | G11C 29/808 |
| 2020/0387427 A1* | 12/2020 | Mekhanik | G06F 3/064 |
| 2021/0397348 A1* | 12/2021 | Agarwal | G06F 3/0631 |
| 2022/0269436 A1* | 8/2022 | Kellam | G06F 12/0284 |

OTHER PUBLICATIONS

EP Response filed Jan. 2, 2024 in Response to the Extended European Search Report dated Jun. 19, 2023 and the Official Communication Pursuant to Rules 70(2) and 70a(2) EPC dated Jul. 6, 2023. 21 pages.

EP Extended European Search Report with Mail Date Jun. 19, 2023 re: EP Appln. No. 20844273.1. 10 pages.

Schuiki, Fabian et al., "A Scalable Near-Memory Architecture for Training Deep Neural Networks on Large In-Memory Datasets", IEEE Transactions on Computers, vol. 68, No. 4, Apr. 2019. 14 pages.

Debabani Choudhury "3D Integration Technologies for Emerging Microsystems" 978-1-4244-7732-6/101 © 2010 IEEE. 4 pages.

Duckhwan Kim et al. "Neurocube: A Programmable Digital Neuromorphic Architecture with High-Density 3D Memory" 2016 ACM/IEEE 43rd Annual International Symposium on Computer Architecture. 14 pages.

Gentry, "Computing arbitrary functions of encrypted data", In: Communication of the ACM. Jul. 29, 2010 (Jul. 29, 2010) Retrieved on Oct. 26, 2020 (Oct. 26, 2020) from <http://www.hit.bme.hu/-buttyan/courses/BMEVIHM219/2012/hw/Computing_Arbitrary Functions_of_Encrypted_Data.pdf> entire document. 23 pages.

Mingyu Gao, "Tetris: Scalable and Efficient Neural Network Acceleration with 3D Memory" 2017 Copyright Publication rights licensed to ACM. ISBN 978-1-4503-4465-4/17/04. 14 pages.

Notification of Transmittal of the International Search Report and the Written Opinion of the International Search Authority, or the Declaration with Mail Date Nov. 24, 2020 re: Int'l Appln. No. PCT/US2020/040884. 21 pages.

EP Response filed Nov. 7, 2024 in Response to the Official Communication Pursuant to Art. 94(3) EPC dated Jul. 15, 2024. 20 pages.

CN Office Action with Mail Date May 6, 2024 re: CN Appln. No. 202080052156.8. 18 pages. (W/translation).

EP Communication Pursuant to Article 94(3) EPC with Mail Date Jul. 15, 2024 re: EP Appln. No. 20844273.1. 5 pages.

EP communication Pursuant to Article 94(3) EPC with mail date Feb. 5, 2026 re: EP Appln. No. 20844273.1. 6 pages.

* cited by examiner

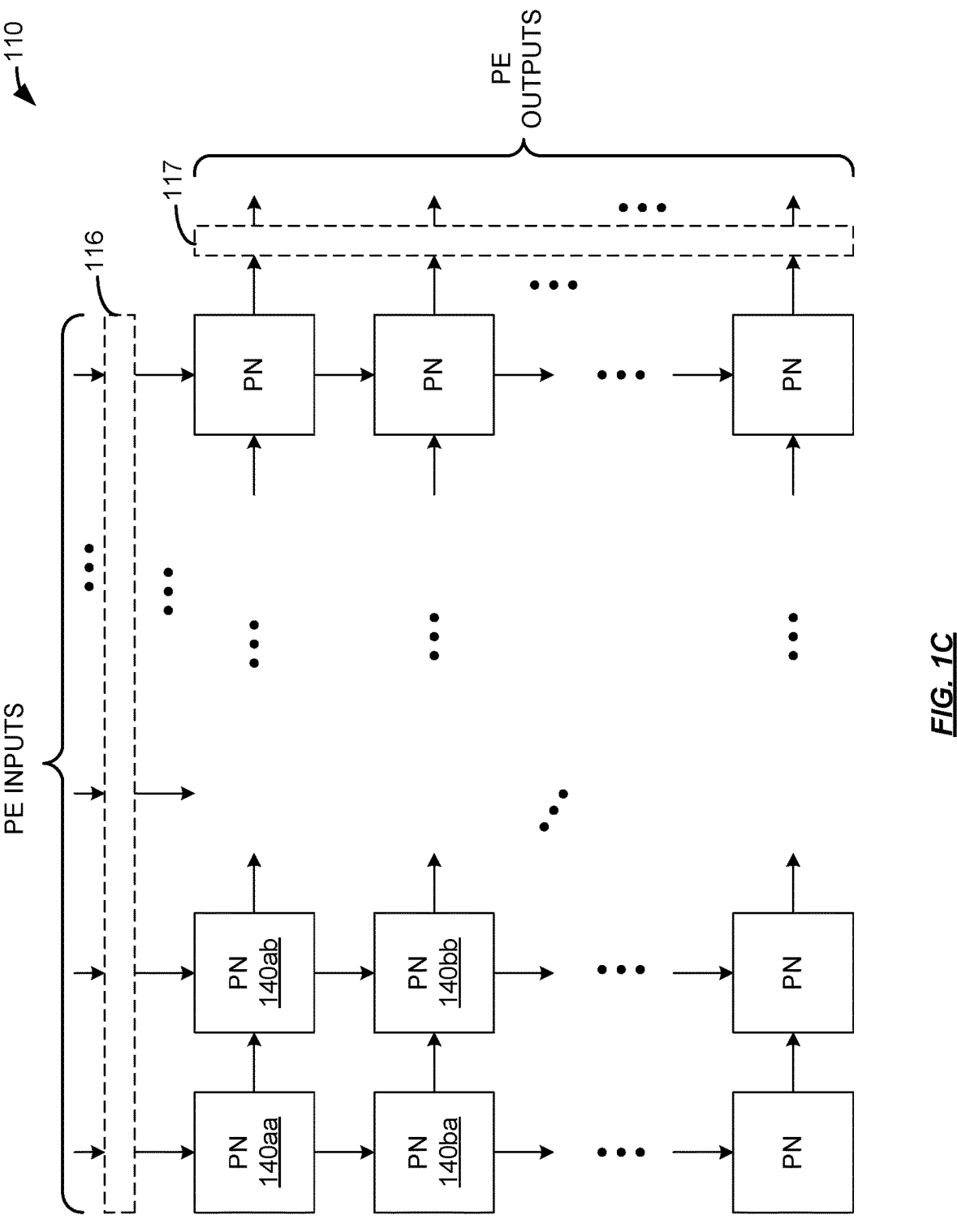
_FIG. 1C_

401

475a 473 471

472

470a

465a 435a 433a 436a 432a 437a 431a

460a

402

465b

475b 435b     433b

476

436b     432b 437b     431b

410

477

478

470b

485

480

486

501

DRAM STACK 570

ASM 505

BASE DIE 580

PROCESSOR 593

MEM CNTRL 594

MEM PHY 592

INTPSR 591

DETECT 585

584

583

582

581

588

589

587

MEM PHY 586

605

TSVs 675

BUMPS 677

BASE DIE 680

TSVs 685

DRAM STACK 670

BUMPS 687

606b

LOGIC DIE 611

TSVs 675

DRAM STACK 670

BASE DIE 680

TSVs 685

BUMPS 687

COMPUTE ACCELERATED STACKED MEMORY

BRIEF DESCRIPTION OF THE DRAWINGS

FIG. 1C illustrates a first example processing element.

DETAILED DESCRIPTION OF THE EMBODIMENTS

Figure 1A:
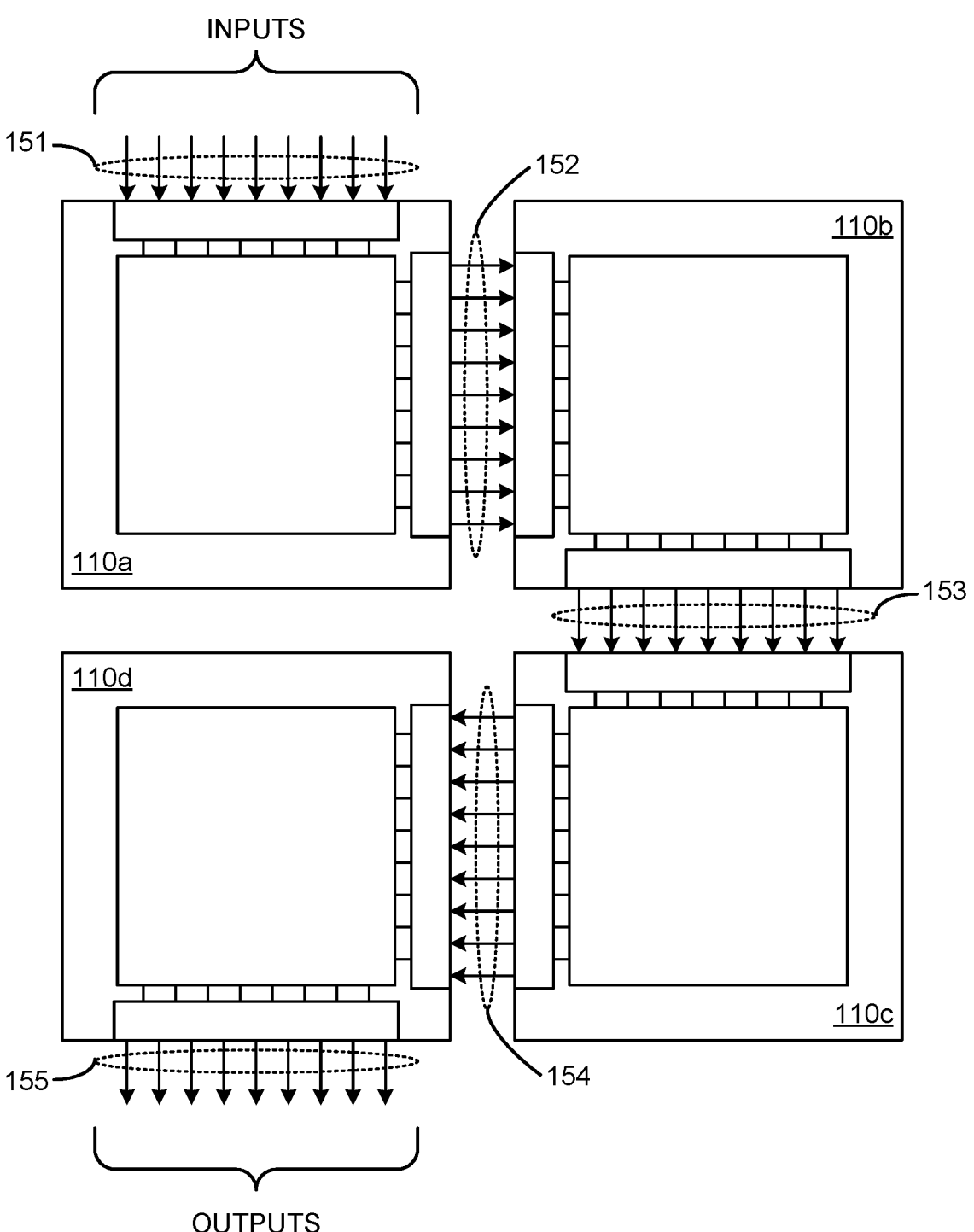
FIGS. 1A-1B illustrate example layouts for chained processing elements.

In an embodiment, an interconnected stack of one or more Dynamic Random Access Memory (DRAM) die has a base logic die and one or more custom logic or processor die. Custom die may be attached as a last step and interconnected vertically with the DRAM die(s) by shared through-silicon via (TSV) connections that carry data and control signals throughout the stack. A circuit on the base die may transmit and receive data and control signals over an interface to an external processor and/or circuitry. A detector circuit on the base die can (at least) detect the presence of the logic die and respond by selectively disabling the external receipt and/or transmission of data and control signals if the logic die is present and enable external receipt and/or transmission if it is not. The detector circuit can also adaptively enable and disable external receipt and/or transmission of data based on information from the SoC or the system it is connected to. A logic circuit located on either the base die or the logic die may selectively manage the access to memory data in the stack via the data and control TSVs.

In an embodiment, the logic die, in addition to being suited for incorporation into a stacked set of DRAM dies, may include one or more connected chains of processing elements. These processing elements may be designed and/or architected for the fast execution of artificial intelligence, neural network, and/or machine learning tasks. Thus, the processing elements may be configured to, for example, perform one or more operations to implement a node of a neural network (e.g., multiply a neural network node input value by a corresponding weight value and accumulate the result). In particular, the processing elements in a chain can compute partial results (e.g., an accumulation of a subset of the weighted input values to a neuron, and/or an accumulation of a subset of the products of a matrix multiplication) from data received from an upstream processing element, store results, and pass results (e.g., neuron output value and/or a partial sum of a matrix multiplication) to a downstream processing element. Thus, the processing element chains of an embodiment are well adapted to parallel processing artificial intelligence, neural network, and/or machine learning tasks.

In an embodiment, the logic die has centrally located global input/output (I/O) circuitry and TSVs that allow it to interface to other dies in a stack (e.g., a High-Bandwidth Memory type stack.) Thus, the logic die may access data stored in the DRAMs, access data stored externally to the stack (e.g., via the base die and TSVs), and/or be accessed by external processors (e.g., via the base die and TSVs.) The logic die may also include buffers coupled between the global I/O circuitry and respective chains of processing elements. The respective buffers may be further interconnected in a ring topology. With this arrangement, the chains of processing elements can communicate, via the buffers, with other chains of processing elements (via the ring), the DRAMs in the stack (via the global I/O), and external circuitry (also via the global I/O.) In particular, partial results may be passed from chain to chain via the ring without occupying the bandwidth of the global I/O circuitry.

In an embodiment, the processing elements of the chains may include interfaces that allow direct access to memory banks on one or more DRAMs in the stack. These interfaces may access DRAM memory banks via TSVs that are not used for global I/O. These additional (e.g., per processing element) interfaces may allow the processing elements to have more direct access to the data in the DRAM stack than using the global I/O's. This more direct access allows more rapid access to the data in the DRAM stack for tasks such as (but not limited to): rapidly loading weights to switch between neural network models, overflow for large neural network models, and rapidly storing and/or retrieving activations.

FIG. 1A illustrates an example layout for chained processing elements. In FIG. 1A, processing elements 110a-110d are illustrated. Processing elements 110a-110d are in a coupled chain to independently compute complete or partial results as functions of data received, store these results, and pass these results directly to a next processing element in the coupled chain of processing elements. Each processing element 110a-110d receives inputs via a first side and provides outputs via an adjacent side. By rotating and/or flipping the layout of each processing element 110a-110d identical (other than rotating and/or flipping) processing elements 110a-110d may be chained together such that the outputs of one processing elements align with the inputs of the next processing element in the chain. Thus, processing elements 110a-110d may be arranged and connected together in the manner illustrated in FIG. 1A such that the inputs 151 for a chain of four processing elements 110a-110d will be aligned with the outputs 155 of the four processing elements 110a-110d.

The arrangement shown in FIG. 1A allows chains of more than four processing elements to be formed efficiently by having the outputs (e.g., 155) from one sub-chain of four processing elements align with the inputs (e.g., 151) of the next sub-chain of four processing elements. It should also be understood that chains and/or sub-chains with other numbers of processing elements are contemplated—for example 1 or 2 processing elements. It is also contemplated that chains may be formed where the outputs from one sub-chain (e.g., sub-chains of 1, 2, 3, 4, etc. processing elements 110a-110c) do not align with the inputs to the next sub-chain of (any number of) processing elements.

In FIG. 1A, inputs 151 to the chain of four processing elements 110a-110d are illustrated being provided to the top of the page side of processing element 110a. Processing element 110a provides outputs 152 from the right side of processing element 110a. Processing element 110b is positioned to the right of processing element 110a. The outputs 152 from processing element 110a are received on the left side of processing element 110b. Processing element 110b provides outputs 153 from the bottom side of processing element 110b. Processing element 110c is positioned directly below processing element 110b. The outputs 153 from processing element 110b are received on the top side of processing element 110c. Processing element 110c provides outputs 154 from the left side of processing element 110c. Processing element 110d is positioned to the left of processing element 110c. The outputs 154 from processing element 110c are received on the right side of processing element 110d. Processing element 110d provides outputs 155 from the bottom of the page side of processing element 110d. It can be seen from FIG. 1A that inputs 151 of the chain of four processing elements 110a-110d are received in a location that aligns left to right with the outputs of the chain of four processing elements 110a-110d. Thus, it should be understood that one or more additional chains of four processing elements may either supply inputs 151, receive outputs 155, or both. This is further illustrated in FIG. 1B.

Figure 1B:
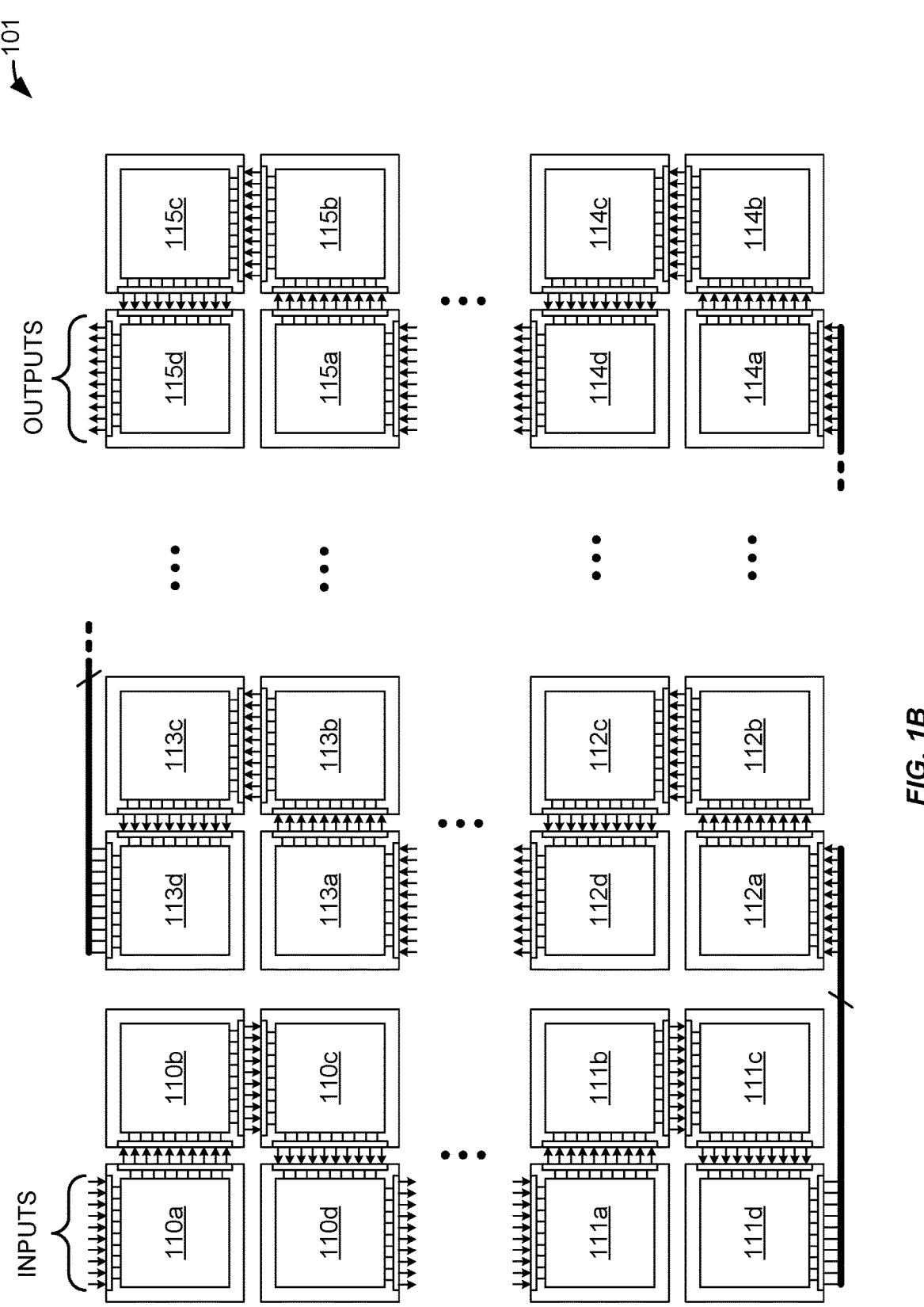

FIG. 1B illustrates an example layout for chained processing elements. In FIG. 1B, an array of chained processing elements is illustrated. In FIG. 1B, chained processing array 101 comprises processing elements 110a-110d, 111a-111d, 112a-112d, 113a-113d, 114a-114d, and 115a-115d. The inputs to a sub-chain of four processing elements 110a-110d are illustrated as being provided to the top of the page side of processing element 110a. The outputs from the sub-chain of four processing elements 110a-110d are illustrated as being provided from the bottom of processing element 110d and aligned left to right with the inputs to processing elements 110a and 111a. The inputs to the sub-chain of four processing elements 111a-111d are illustrated as being provided to the top of the page side of processing element 111a. Thus, processing element 111a is an input processing element that receives data from an input interface (not shown in FIG. 1B) to the coupled chain of processing elements.

The outputs from the sub-chain of four processing elements 111a-111d are illustrated as being provided from the bottom of processing element 111d and are routed to the inputs of the sub-chain of four processing elements 112a-112d. The sub-chain of four processing elements 112a-112d are at the bottom of a different column of sub-chains of processing elements than processing elements 110a-110d and 111a-111d.

The inputs to the sub-chain of four processing elements 112a-112d are illustrated as being provided to the bottom of the page side of processing element 112a. The outputs from the sub-chain of four processing elements 112a-112d are illustrated as being provided from the top of processing element 112d and aligned left to right with the inputs to processing elements 112a and 113a. This pattern is repeated for processing elements 113a-113d, 114a-114d, and 155a-115d. Processing element 115d provides the outputs from array 101 on the top of the page side of processing element 115d. Thus, processing element 115d is an output processing element that provides data to an output interface (not shown in FIG. 1B) to the coupled chain of processing elements.

FIG. 1C illustrates a first example processing element. In FIG. 1C, processing element 110 comprises processing nodes 140aa-140bb, optional input buffer circuitry 116, and optional output buffer circuitry 117. Processing nodes 140aa-140bb are arranged in a two dimensional grid (array). Processing nodes 140aa-140bb are arranged such that each processing node 140aa-140bb receives an input from the top of the page direction and provides an output (result) to the next processing node to the right. The top row 140aa-140ab of the array of processing element 110 receives respective inputs from input buffer circuitry 116. The righthand most column of the array of processing element 110 provides respective outputs to output buffer circuitry 117. It should be understood that processing element 110 is configured as a systolic array. Thus, each processing node 140aa-140bb in the systolic array of processing element 110 may work in lock step with its neighbors.

Note that like processing elements 110a-110d, 111a-111d, 112a-112d, 113a-113d, 114a-114d, and 115a-115d, the inputs to processing element 110 are received via a first side and outputs are provided via an adjacent side. Thus, like processing elements 110a-110d, 111a-111d, 112a-112d, 113a-113d, 114a-114d, and 115a-115d, by rotating and/or flipping the layout of multiple identical (other than rotating and/or flipping) processing elements 110, multiple processing elements 110 may be chained together such that the outputs of one processing elements align with the inputs of the next processing element in the chain.

Figure 1D:
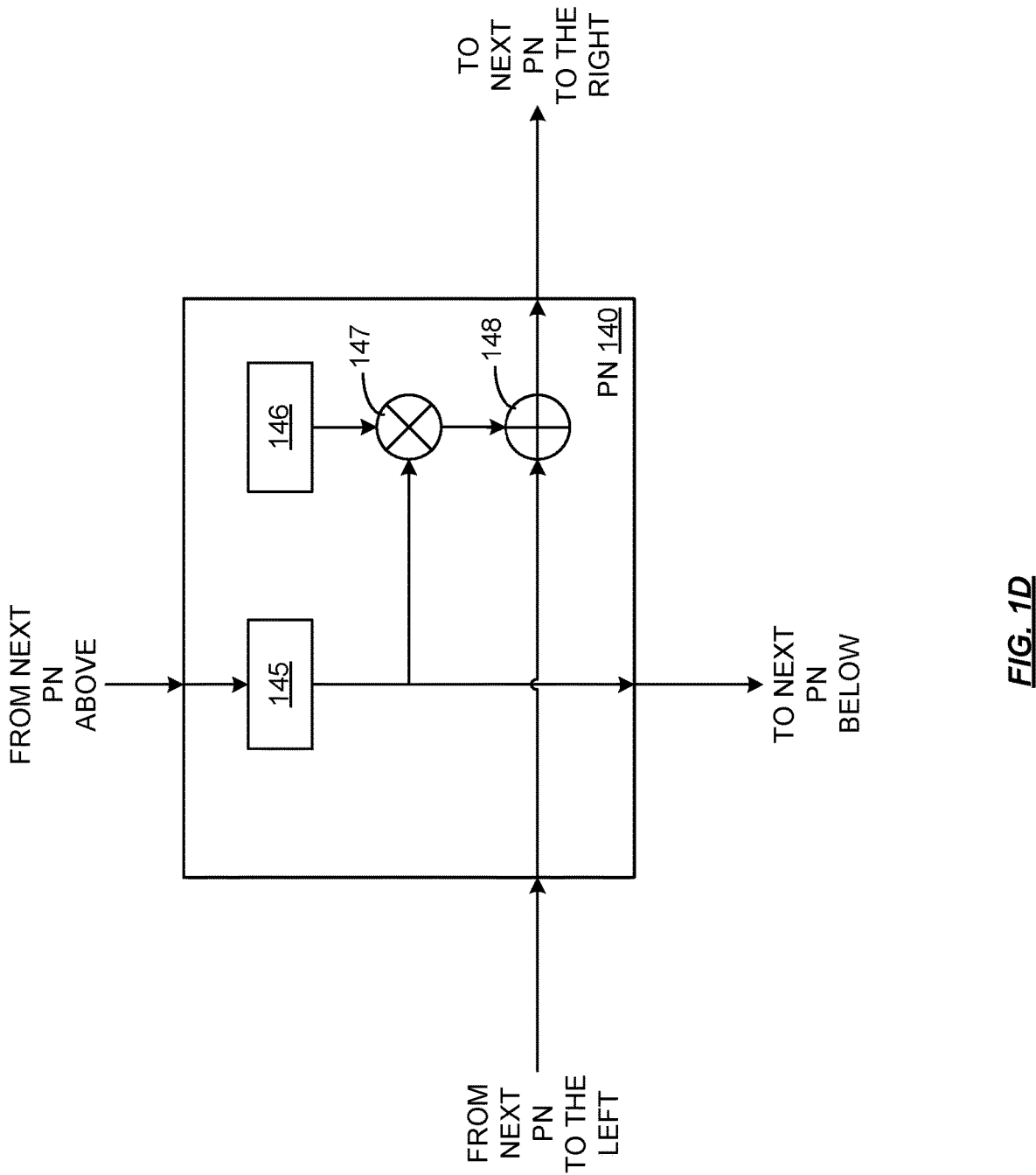
FIG. 1D illustrates a first example processing node of a processing element.

FIG. 1D illustrates an example processing node of a processing element. Processing node 140 may be, or be a part of, processing nodes 140aa-140bb, processing element 110, processing elements 110a-110d, 111a-111d, 112a-112d, 113a-113d, 114a-114d, and/or 115a-115d. Processing node 140 comprises memory function 145 (e.g., a register), memory function 146 (e.g. a register or SRAM), multiply function 147, and addition (accumulate) function 148. The value in memory function 145 is received from the next processing node adjacent to (e.g., above) processing node 140 (or an input to the processing element.) The value in memory function 145 is multiplied by the value in memory function 146 by multiply function 147. The output of multiply function 147 is provided to accumulate function 148. Accumulate function 148 receives a value from the next processing node to the left. The output of accumulate function 148 is provided to the next processing node to the right (or an output of the processing element.) The value in memory function 145 is provided to the next processing node below.

Figure 1E:
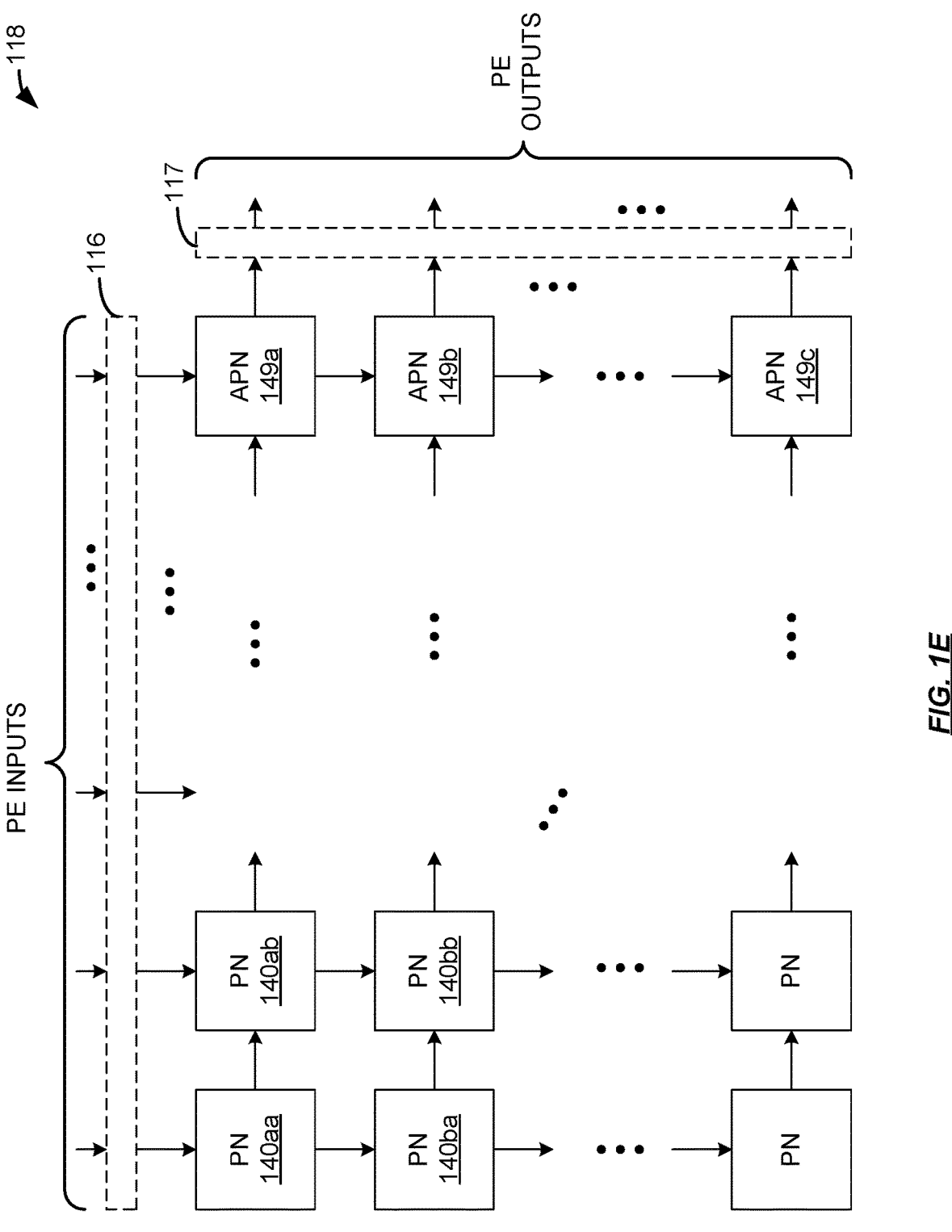
FIG. 1E illustrates a second example processing element.

FIG. 1E illustrates a second example processing element. In FIG. 1E, processing element 118 comprises processing nodes 140aa-140bb, activation processing nodes 149a-149c, optional input buffer circuitry 116, and optional output buffer circuitry 117. Processing nodes 140aa-140bb are arranged in a two dimensional grid (array). Processing nodes 140aa-140bb are arranged such that each processing node 140aa-140bb receives an input from the top of the page direction and provides an output (result) to the next processing node to the right. The outputs of processing nodes 149a-149c may be further based on inputs received from input buffer circuitry 116 that is relayed by each processing node 140aa-140bb to the next processing node 140aa-140bb in the column. The top row 140aa-140ab of the array of processing element 118 receives respective inputs from input buffer circuitry 116. The righthand most column of the array of processing element 118 comprises activation processing nodes 149a-149c. Activation processing nodes 149a-149c provide respective outputs to output buffer circuitry 117.

Activation processing nodes 149a-149c may be configured to perform activation functions of a neural network node. The outputs of activation processing nodes 149a-149c are based on (at least) inputs received by activation processing nodes 149a-149c from processing nodes 140aa-140bb to the left of activation processing nodes 149a-149c. The outputs of activation processing nodes 149a-149c may be further based on inputs received from input buffer circuitry 116 that is relayed by each activation processing nodes 149a-149c to the next activation processing node 149a-149c in the column.

The activation function implemented by activation processing nodes 149a-149c may be linear or non-linear functions. These function may be implemented with logic, arithmetic logic units (ALUs), and/or one or more lookup tables. Examples of activation functions that may be used in a neural network node include, but are not limited to: identity, binary step, logistic, Tan h, SQNL, ArcTan, ArcSinH, Softsign, inverse square root unit (ISRU), inverse square root linear unit (ISRLU), rectified linear unit (ReLU), Bipolar rectified linear unit, leaky rectified linear unit (BReLU), leaky rectified linear unit (Leaky ReLU), parametric rectified linear unit (PReLU), exponential linear unit (ELU), scaled exponential linear unit (SELU), S-shaped rectified linear activation unit (SReLU), adaptive piecewise liner (APL), SoftPlus, Bent identity, GELU, sigmoid linear unit (SiLU), SoftExponential, soft clipping, sinusoid, sinc, Gaussian, SQ-RBF, Softmax, and/or maxout.

In FIG. 1E, activation processing nodes 149a-149c are illustrated as being in the righthand most column and as providing their outputs to output buffer circuitry 117. It should be understood that this is one example. Embodiments where activation processing nodes 149a-149c occupy any or all rows and/or columns of processing element 118 with non-activation processing nodes 140aa-140bb occupying the rest of the locations in the array are contemplated.

It should also be understood that processing element 118 is configured as a systolic array. Thus, each processing node 140aa-140bb and 149a-149c in the systolic array of processing element 118 may work in lock step with its neighbors.

Note that like processing elements 110a-110d, 111a-111d, 112a-112d, 113a-113d, 114a-114d, and 115a-115d, the inputs to processing element 118 are received via a first side and outputs are provided via an adjacent side. Thus, like processing elements 110a-110d, 111a-111d, 112a-112d, 113a-113d, 114a-114d, and 115a-115d, by rotating and/or flipping the layout of multiple identical (other than rotating and/or flipping) processing elements 118, multiple processing elements 118 may be chained together such that the outputs of one processing elements align with the inputs of the next processing element in the chain.

Figure 1F:
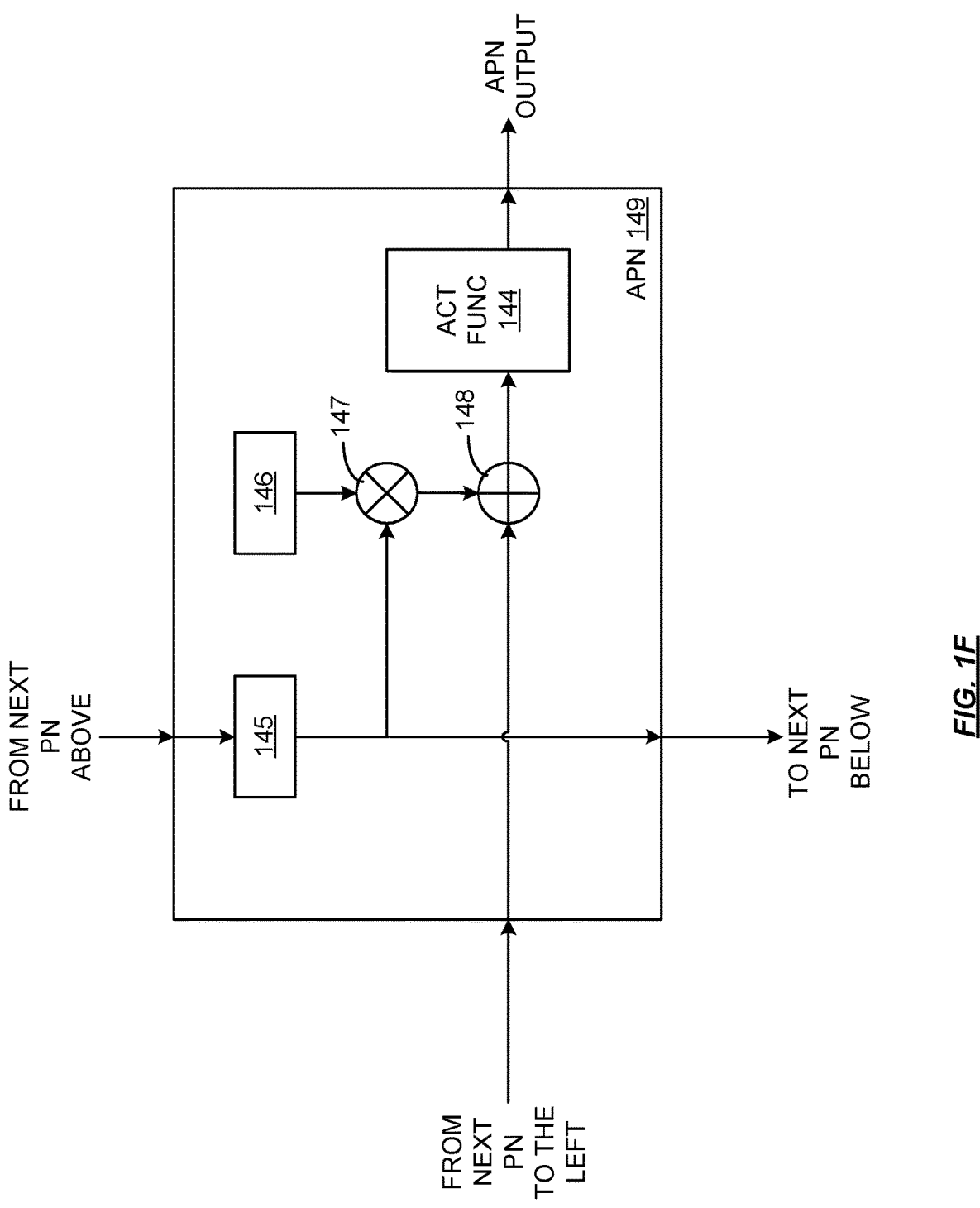
FIG. 1F illustrates an example activation processing node of a processing element.

FIG. 1F illustrates an example activation processing node of a processing element. Activation processing node 149 may be, or be a part of, processing nodes 140aa-140bb, activation processing nodes 149a-149c, processing element 110, processing elements 110a-110d, 111a-111d, 112a-112d, 113a-113d, 114a-114d, 115a-115d, and/or processing element 118. Processing node 149 comprises memory function 145 (e.g., a register), memory function 146 (e.g. a register or SRAM), multiply function 147, addition (accumulate) function 148, and activation function 144. The value in memory function 145 is received from the next processing node above processing node 149 (or an input to the processing element.) The value in memory function 145 is multiplied by the value in memory function 146 by multiply function 147. The output of multiply function 147 is provided to accumulate function 148. Accumulate function 148 receives a value from the next processing node to the left. The output of accumulate function 148 is provided to activation function 144. The output of activation function 144 is provided to the next processing node to the right (or an output of the processing element.) The value in memory function 145 is provided to the next processing node below.

It should be understood that activation processing node 149 is an example. A fewer or greater number of functions may be performed by activation processing node 149. For example, memory function 146, multiply function 147, and/or accumulate function 148 may be eliminated and activation function 144 uses only the input from the processing node to its left as input to the implemented activation function 144.

Figure 1G:
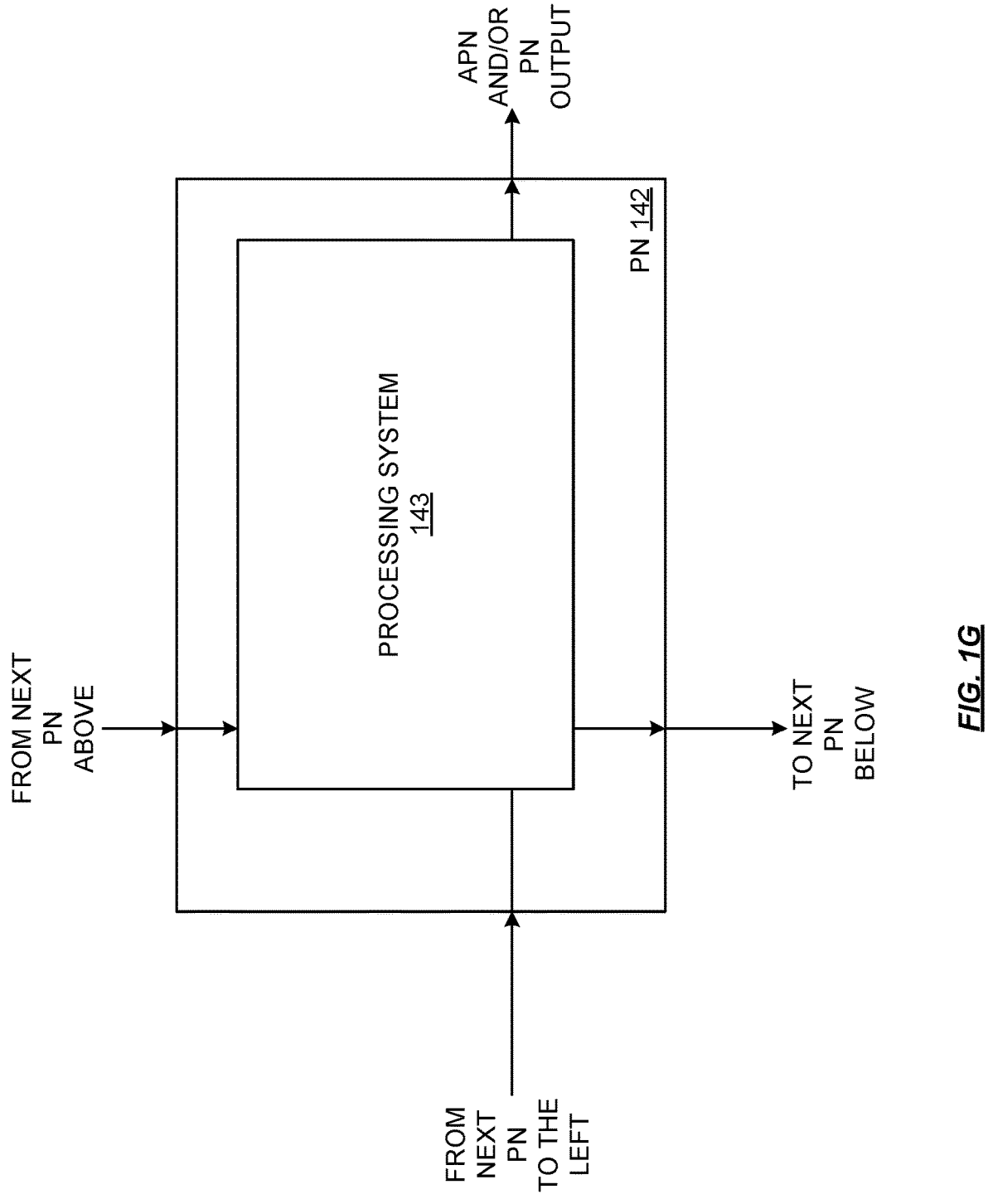
FIG. 1G illustrates a flexible processing node of a processing element.

FIG. 1G illustrates an example processing node of a processing element. Processing node 142 may be, or be a part of, processing nodes 140aa-140bb, activation processing nodes 149a-149c, processing element 110, processing elements 110a-110d, 111a-111d, 112a-112d, 113a-113d, 114a-114d, 115a-115d, and/or processing element 118. Processing node 142 comprises processing system 143.

Processing system 143 may include and/or implement one or more of the following: a memory functions (e.g., a register) and/or SRAM); multiply functions, addition (accumulate) functions; and/or activation functions. At least one value is received from the next processing node above processing node 142 (or an input to the processing element) and is provided to processing system 143. Processing system 143 may be, or include, an application specific integrated circuit (ASIC) device, a graphics processor unit (GPU), a central processing unit (CPU), a system-on-chip (SoC), or an integrated circuit device that includes many circuit blocks such as ones selected from graphics cores, processor cores, and MPEG encoder/decoders, etc.

The output of processing node 142 and/or processing system 143 is provided to the next processing node to the right (or an output of the processing element.) The at least one value that was received from the next processing node above processing node 142 (or an input to the processing element) may be provided to the next processing node below.

Figure 2:
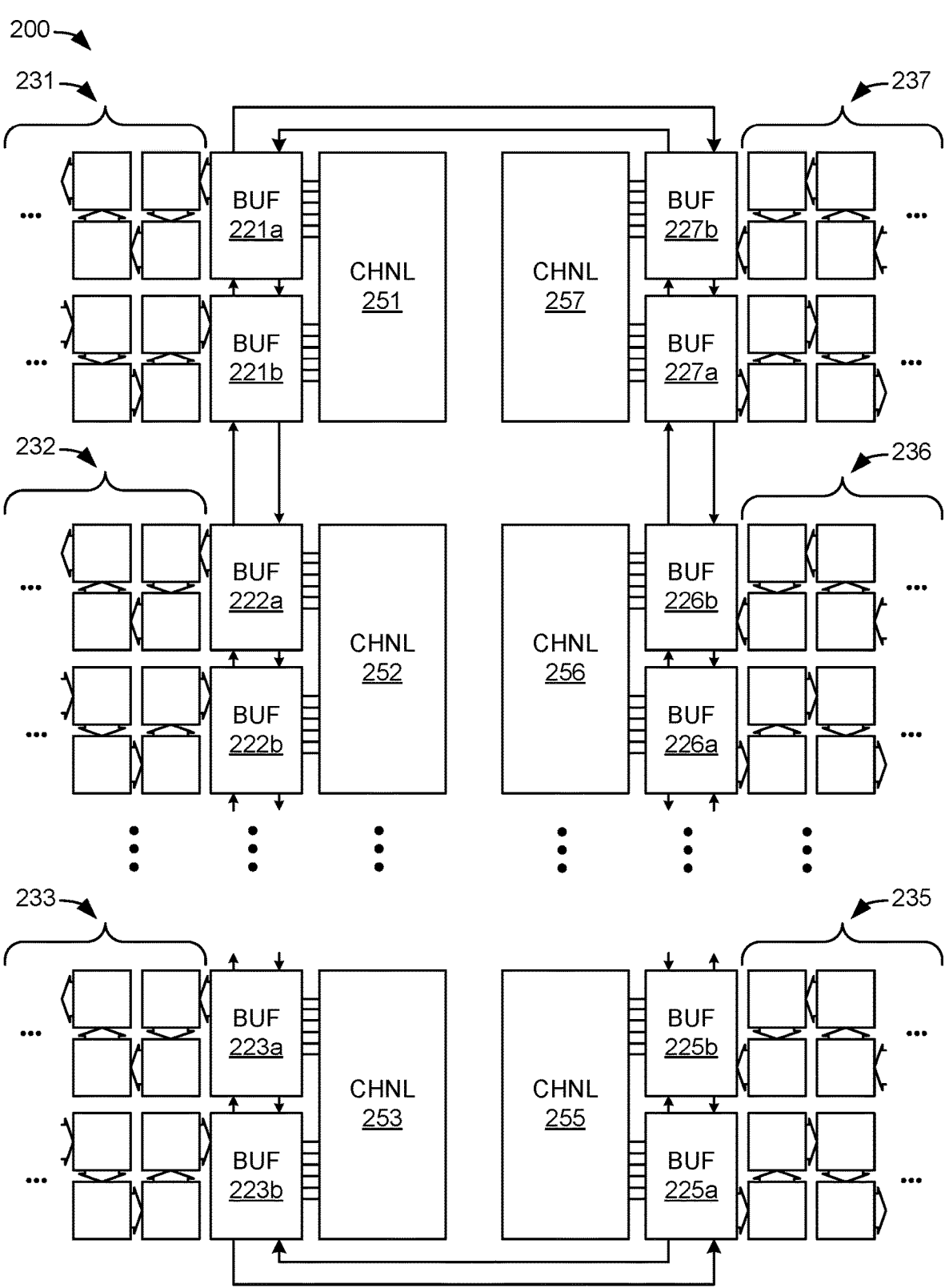
FIG. 2 illustrates an example high-bandwidth memory (HBM) compatible processing die with ring busses.

FIG. 2 illustrates an example high-bandwidth memory (HBM) compatible processing die with ring busses. In FIG.

2, processing die 200 comprises centrally located HBM compatible channel connections (e.g., TSVs) 251-253, 255-257, staging buffers 221a-223a, 221b-223b, 225a-227a, 225b-227b, and processing element chains 231-233, 235-237. Processing die 200 comprises one or more logic layers used to construct the circuitry residing on processing die 200. In an embodiment, the circuits of processing die 200 may be integrated with the functions of an HBM base die. In another embodiment, the circuits of processing die 200 may be on a separate die that is stacked with an HBM base die and one or more HBM DRAM dies. In an embodiment, processing die 200 is connection compatible with an HBM standard and therefore implements eight (8) channel connections 251-253, 255-257, sixteen (16) staging buffers 221a-223a, 221b-223b, 225a-227a, 225b-227b, and eight (8) processing element chains 231-233, 235-237. However, other numbers (e.g., 1, 2, 4, 6, 16, etc.) of processing chains and/or channel connections are contemplated.

Channel 251 is operatively coupled to staging buffer 221a. Staging buffer 221a is operatively coupled to inputs of processing element chain 231. Outputs of processing element chain 231 are operatively coupled to staging buffer 221b. Staging buffer 221b is operatively coupled to channel 251. Thus, channel 251 may be used to supply input data to staging buffer 221a. Staging buffer 221a may provide that input data to processing element chain 231. Result data from processing element chain 231 may be received by staging buffer 221b. Staging buffer 221b may provide result data to channel 251 for storage and/or other uses. Channels 252-253, 255-257 are operatively coupled in a like manner to corresponding staging buffers 222a-223a, 222b-223b, 225a-227a, 225b-227b, and corresponding processing element chains 232-233, 235-237.

Staging buffers 221a-223a, 221b-223b, 225a-227a, 225b-227b, are coupled to each other via a ring topology. The ring interconnection allows input data and/or output data (results) from processing chains 231-233, 255-257 to be communicated with any other processing chain 231-233, 255-257 and/or any channel 251-253, 255-257. In FIG. 2, two rings communicating data in opposite directions are illustrated. However, it should be understood that a single ring, or more than two rings are contemplated. For example, there can be a hierarchy of rings. In other words, in addition to the rings illustrated in FIG. 2, there can be additional rings (not illustrated in FIG. 2) that connect a subset of the channel Interfaces (e.g. 251 and 257, 252 and 256, or groups of 4 channels, etc.). This allows the channel connections 251-253, 255-257 and processing element chains 232-233, 235-237 to be partitioned into logical units that can be operating on different jobs at the same time, but that can also communicate across these partitions as needed.

The configuration of processing die 200 allows data communicated by any channel 251-253, 255-257 to be communicated with any processing chain 231-233, 235-237. Thus, for example, processing die 200 may concurrently run computations for N number of neural networks (one on each processing chain 231-233, 235-237), where N is the number of processing chains 231-233, 235-237 on processing die 200 (e.g., N=8.) In another example, because the data for a neural network input layer can be communicated via any of the N channels 251-253, 255-257, fault tolerance may be improved by running computations for one neural network on multiple processing chains 231-233, 235-237.

In other examples, the resources of processing die 200 may be allocated to do distributed inferencing. One example of such an allocation would be to provide each neural network being computed on a respective processing chain

231-233, 235-237 with 1/N (e.g., N=8) of the samples. Implementing a convolutional neural network, for example, may be accomplished by providing copies of all the weights to each processing chain 231-233, 235-237, and then have each processing chain apply a different portion of the filters. This parallelizes (by N) the application of filters to an image and/or layer.

Further example allocations of the resources of processing die 200 help speed neural network training. One example is to have N (e.g., N=8) copies of a neural network being computed by each processing chain 231-233, 235-237 and having them perform distributed gradient descent (e.g., 1/N of the training samples being provided to each processing chain 231-233, 235-237.) In another allocation, one neural network that is computed across more than one (e.g., N) processing chain may be trained. In an embodiment, to facilitate training, the direction of data flow between the inputs and outputs of the processing elements of the processing chains 231-233, 235-237 may be reversible to help support backward passes of the training algorithm.

Figure 3:
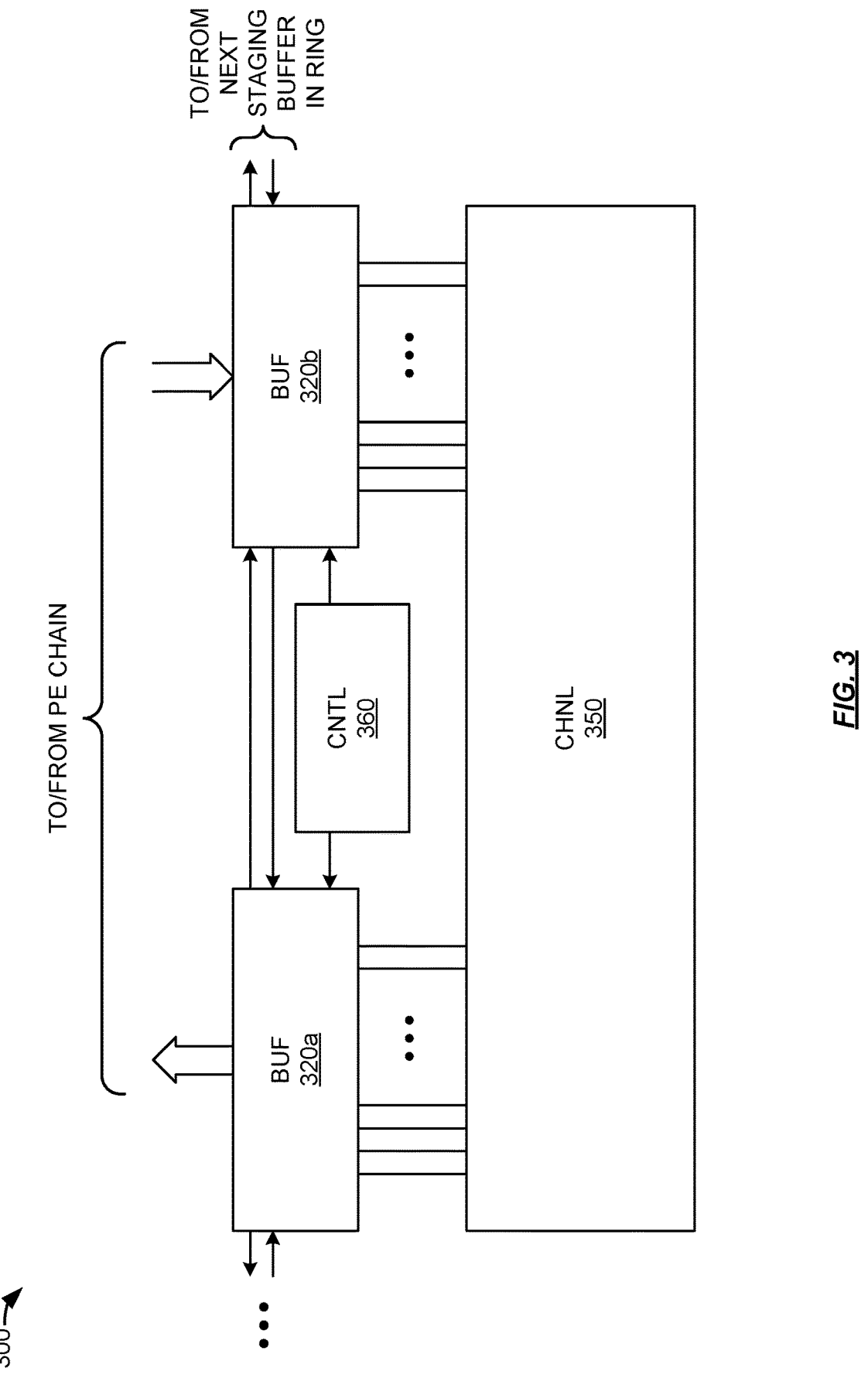
FIG. 3 illustrates further detail regarding HBM compatible staging buffers.

FIG. 3 illustrates further detail regarding HBM compatible staging buffers. FIG. 3 illustrates example circuitry 300 that can couple channel data between local channel connections, a local processing chain, remote channels, and remote processing chains. Thus, for example, circuitry 300 may be local to channel 251 and therefore couple data between local processing chain 231, remote channels 252-253, 255-257 (e.g., via an interconnection of additional instances of circuitry 300), and remote processing chains 232-233, 235-237 (also, e.g., via an interconnection of additional instances of circuitry 300).

Circuitry 300 includes channel connections 350, staging buffer 320a, staging buffer 320b, and control circuitry 360. Staging buffers 320a-320b are operatively coupled to channel connections 350 and a local processing chain (not illustrated in FIG. 3.) Control 360 is operatively coupled to staging buffers 320a-320b. Control 360 includes logic for configuring staging buffers 320a-320b and memory controller functionality to enable accessing data via channel connections 350.

Staging buffers 320a-320b include logic for routing data between a channel 350 and a local processing chain (not illustrated in FIG. 3.) In particular, staging buffer 320a can provide data to the inputs of a processing chain. Staging buffer 320b can receive data from a processing chain. Staging buffer 320a and/or staging buffer 320b may include memory elements (e.g., FIFO buffer) to help match data arrival and dispatch rates between the processing chain and/or other staging buffers.

Figure 4A:
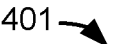
FIGS. 4A-4B illustrate example HBM compatible processing assemblies.

FIG. 4A illustrates an exploded view of a first example HBM compatible processing assembly. In FIG. 4A, HBM compatible assembly 401 includes DRAM stack 470a and base die 460a. The DRAMs in DRAM stack 470a include memory banks 471-473 and channel connections 475a. Base die 460a includes channel connections 465a and processing chain circuitry 431a-433a, 435a-437a. Channel connections 475a and channel connection 465a include multiple independent memory channels that access the memory banks 471-473 of the DRAMs in memory stack 470a.

In an embodiment, each block of processing chain circuitry 431a-433a, 435a-437a is coupled locally to one of multiple independent memory channels (e.g., 8 memory channels) so that each block of processing chain circuitry 431a-433a, 435a-437a may, independently of each other block of processing chain circuitry 431a-433a, 435a-437a, access one or more memory banks 471-473 of the DRAMs in memory stack 470a. Processing chain circuitry 431a-

433a, 435a-437a may also be interconnected to share data and/or access one or more memory banks 471-473 of the DRAMs in memory stack 470a that are accessed by channels that are not local to that respective processing chain circuitry 431a-433a, 435a-437a.

Figure 4B:
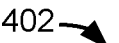

FIG. 4B illustrates an exploded view of second example HBM compatible processing assembly. In FIG. 4B, HBM compatible assembly 402 includes processing die 410, DRAM stack 470b and base die 480. The DRAMs in DRAM stack 470b include memory banks 476-478 and channel connections 475b. Base die 480 includes channel connections 485 and external interface circuitry 486. Processing die 410 includes channel connections 465b and processing chain circuitry 431b-433b, 435b-437b. Channel connections 465b, channel connection 475b, and channel connections 485 include multiple independent memory channels that access the memory banks 476-478 of the DRAMs in memory stack 470b.

In an embodiment, each block of processing chain circuitry 431b-433b, 435b-437b is coupled locally to one of multiple independent memory channels (e.g., 8 memory channels) so that each block of processing chain circuitry 431b-433b, 435b-437b may, independently of each other block of processing chain circuitry 431b-433b, 435b-437b, access one or more memory banks 476-478 of the DRAMs in memory stack 470b. Processing chain circuitry 431b-433b, 435b-437b may also be interconnected to share data and/or access one or more memory banks 476-478 of the DRAMs in memory stack 470b that are accessed by channels that are not local to that respective processing chain circuitry 431b-433b, 435b-437b. External interface circuitry 486 is coupled locally to one or more of the multiple independent memory channels (e.g., 8 memory channels) so that circuitry external to assembly 402 may independently access one or more memory banks 476-478 of the DRAMs in memory stack 470b.

Figure 5A:
FIGS. 5A-5B are block diagrams illustrating example HBM compatible system configurations.

FIG. 5A is a block diagram illustrating a first example HBM compatible system configuration. In FIG. 5A, processing system configuration 501 comprises a memory stack assembly 505, interposer 591, memory PHY 592, processor 593. Processor includes memory controller 594. Memory stack assembly 505 includes stacked DRAM devices 570 that are stacked with a base die 580. Base die 580 includes logic die detect 585, memory PHY 586, 2:1 multiplexors (MUXs) 587, isolation buffers 588, and isolation buffers 589.

Base die 580 is operatively coupled to the DRAMS of DRAM stack 570 via memory PHY 582, data signals 583, and logic die detect signal 584. Memory control signals 581 are coupled through DRAM stack 570 to the top of DRAM stack 570. In an embodiment, memory control signals 581 are not operatively coupled to the active circuitry of DRAM stack 570 and are therefore unused in the configuration illustrated in FIG. 5A. In another embodiment, one or more of memory control signals 581 may be configured to interact with one or more dies of DRAM stack 570. Data signals are communicated with base die 580 and processor 593 via interposer 591. Memory control signals are communicated with base die 580 and memory controller 594 via memory PHY 592 and interposer 591.

Based at least in part on the logic state of logic die detect signal 584, base die 580: enables isolation buffers 588 to communicate data signals 583 with processor 593; enables isolation buffers 589 to communicate memory control signals, and; controls MUXs 587 to use memory control signals from isolation buffers 589 as the memory PHY signals 582 that are provided to DRAM stack 570. Thus, it should be understood that, in the configuration illustrated in FIG. 5A, memory PHY 586 and memory control signals 581 may be unused and may be inactive. It should also be understood that, in this configuration, assembly 505 may appear to processor 593 (or other external devices/logic) as a standard HBM compatible assembly.

Figure 5B:
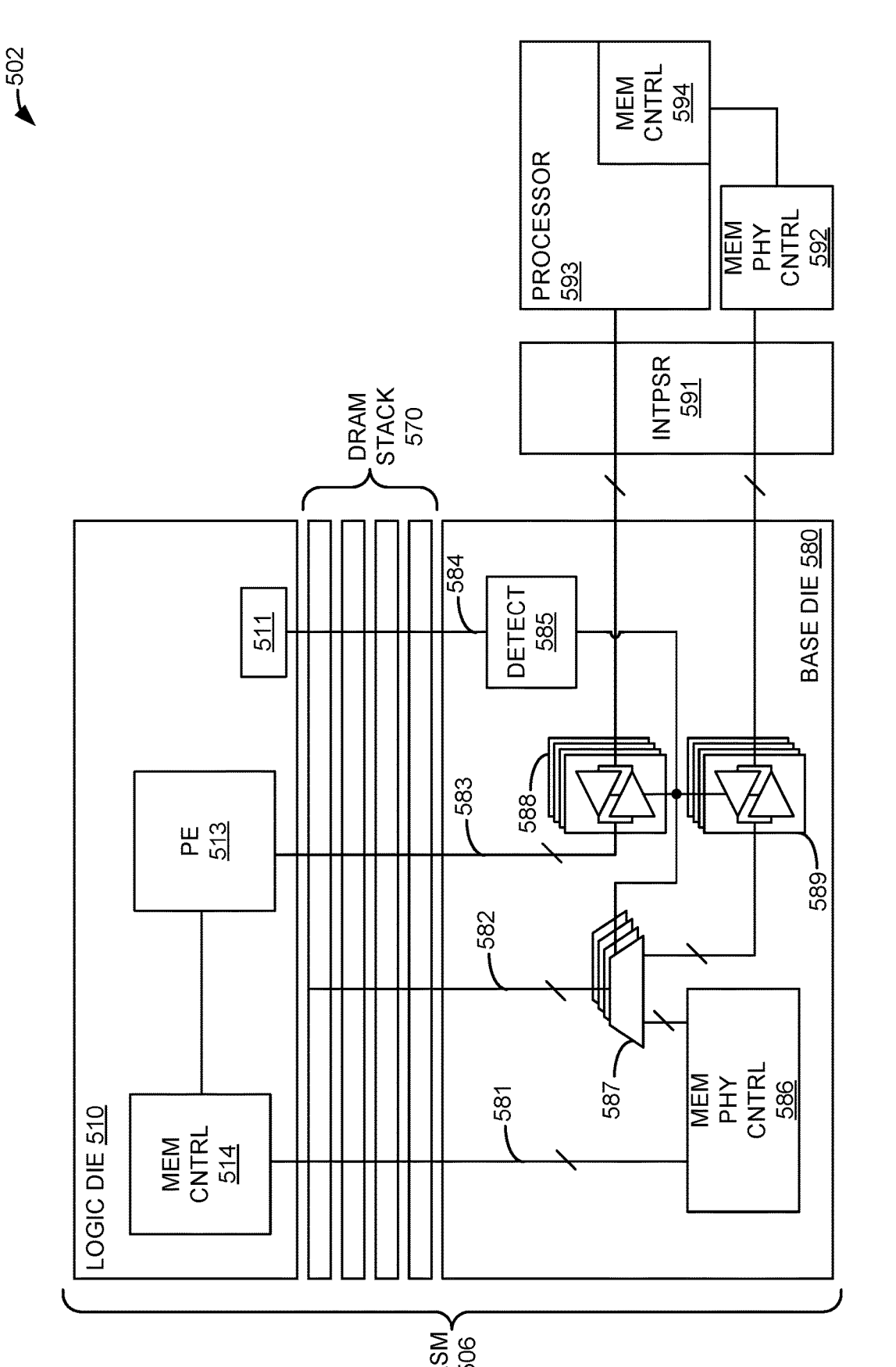

FIG. 5B is a block diagram illustrating a second example HBM compatible system configuration. In FIG. 5B, processing system configuration 502 comprises a memory stack assembly 506, interposer 591, memory PHY 592, processor 593. Processor includes memory controller 594. Memory stack assembly 506 includes stacked DRAM devices 570 that are stacked with base die 580 and logic die 510. Base die 580 includes logic die detect 585, memory PHY 586, 2:1 multiplexors (MUXs) 587, isolation buffers 588, and isolation buffers 589. Logic die 510 includes die detect signal generator 511, processing element 513, and memory controller 514.

Base die 580 is operatively coupled to the DRAM dies of DRAM stack 570 via memory PHY signals 582, data signals 583, and logic die detect signal 584. Memory control signals 581 are coupled through DRAM stack 570 to logic die 510. Base die 580 is operatively coupled to logic die 510 via memory control signals 581, memory PHY signals 582, data signals 583, and logic die detect signal 584.

Data signals may be communicated with base die 580 and processor 593 via interposer 591. Memory control signals may be communicated with base die 580 and memory controller 594 via memory PHY 592 and interposer 591.

Based at least in part on the logic state of logic die detect signal 584, base die 580: prevents isolation buffers 588 from communicating data signals 583 with processor 593; prevents isolation buffers 589 from communicating memory control signals, and; controls MUXs 587 to use memory control signals 581 from memory controller 514 as relayed by memory PHY 586 as the memory PHY signals 582 that are provided to DRAM stack 570. Thus, it should be understood that in this configuration, memory controller 514 (via memory PHY 586 and MUXs 587) is controlling the DRAMs of DRAM stack 570. Likewise, data to/from DRAM stack 570 is communicated with processing element 513 of logic die 510 without interference from processor 593 and/or memory controller 594.

In an embodiment, however, processing element 513 and/or processor 593 may configure/control base die 580 such that processor 593 may access DRAM stack 570 to access inputs and/or outputs computed by processing element 513. In this configuration, assembly 505 may appear to processor 593 (or other external devices/logic) as a standard compatible HBM assembly.

Figure 6A:
FIGS. 6A-6C are cross-sectional illustrations of example HBM compatible assemblies.
Figure 6B:
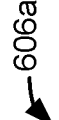
Figure 6B:
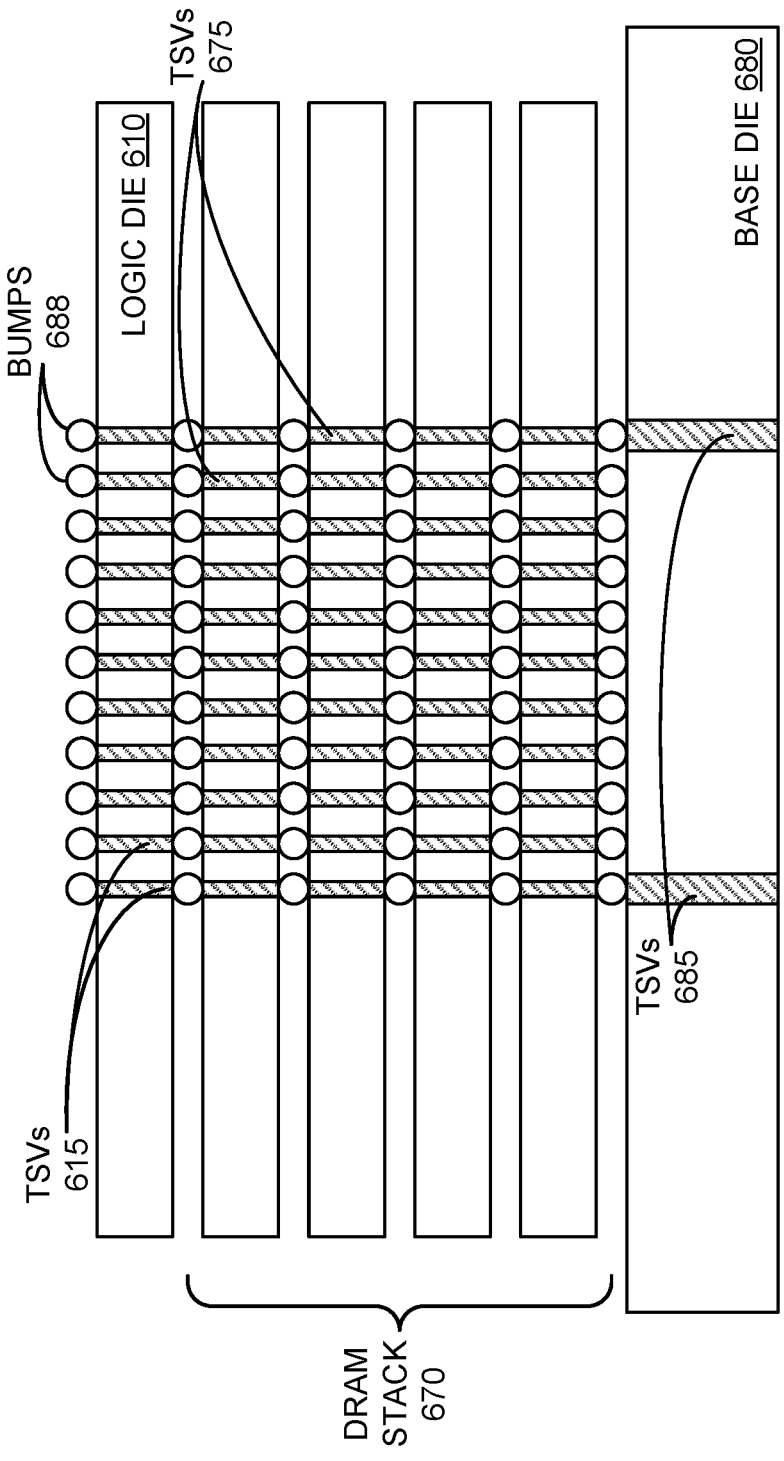
Figure 6C:
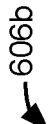

FIGS. 6A-6C are cross-sectional illustrations of example HBM compatible assemblies. In FIG. 6A, HBM compatible assembly 605 comprises DRAM stack 670 and base die 680. Base die 680 includes bumps 687 to operatively couple assembly 605 to external circuitry. Base die 680 may include TSVs 685 to communicate signals (either local or external) with DRAM stack 670. DRAM stack 670 includes bumps 677 and TSVs 675 to operatively couple the DRAMs of DRAM stack 670 to base die 680. One or more of TSVs 685 may or may not align with one or more TSVs 675 of DRAM stack 670. Assembly 605 may be, for example, assembly 505 illustrated in FIG. 5A.

In FIG. 6B, HBM compatible assembly 606a comprises DRAM stack 670, base die 680, and logic die 610. Logic dies 610 includes bumps 688 to operatively couple assembly 606a to external circuitry. Base die 680 may include TSVs 685 to communicate signals (either local or external) with DRAM stack 670 and logic die 610. Logic die 610 may include TSVs 615 to communicate signals (either local or external) to DRAM stack 670 and base die 680. DRAM stack 670 includes bumps and TSVs to operatively couple the DRAMs of DRAM stack 670 to base die 680, and to operatively couple logic die 610 to base die 680 and/or the DRAMs of DRAM stack 670. One or more of TSVs 615 may or may not align with one or more TSVs 675 of DRAM stack 670 and/or TSVs 685 of base die 680 (if present). Assembly 606a may be, for example, assembly 506 illustrated in FIG. 5B.

In FIG. 6C, HBM compatible assembly 606b comprises DRAM stack 670, base die 680, and logic die 611. Base die 680 includes bumps 687 to operatively couple assembly 606b to external circuitry. Base die 680 may include TSVs 685 to communicate signals (either local or external) with DRAM stack 670 and logic die 611. Logic die 611 may communicate signals (either local or external) to DRAM stack 670 and logic die 680. DRAM stack 670 includes bumps and TSVs to operatively couple the DRAMs of DRAM stack 670 to base die 680, and to operatively couple logic die 611 to base die 680 and/or the DRAMs of DRAM stack 670. Assembly 606b may be, for example, assembly 506 illustrated in FIG. 5B.

Figure 7:
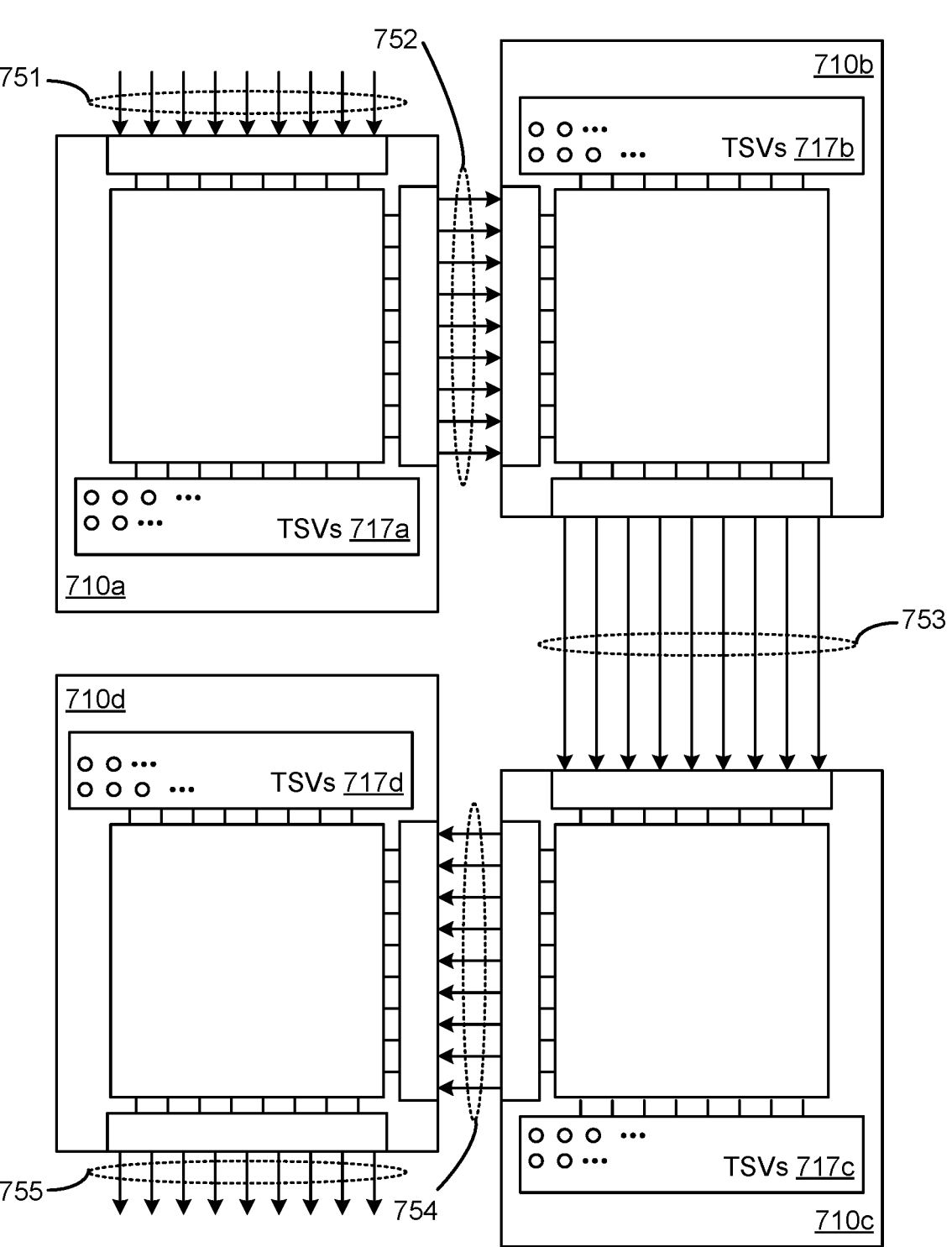
FIG. 7 illustrates an example layout for chained processing elements with through-silicon vias (TSVs) to access to DRAM banks.

FIG. 7 illustrates an example layout for chained processing elements with TSV access to DRAM banks. In FIG. 7, processing elements 710a-710d are illustrated. Processing elements 710a-710d include TSVs 717a-717d, respectively. TSVs 717a-717d may be used by processing elements 710a-710d to access DRAM memory banks on dies (not shown in FIG. 7) that are stacked with the die holding processing elements 710a-710d.

In addition to accessing DRAM memory banks, each processing element 710a-710d can receive inputs via a first side and provide outputs via an adjacent side. By rotating and/or flipping the layout of each processing element 710a-710d identical (other than rotating and/or flipping) processing elements 710a-710d may be chained together such that the outputs of one processing elements align with the inputs of the next processing element in the chain. Thus, processing elements 710a-710d may be arranged and connected together in the manner illustrated in FIG. 7 such that the inputs 751 for a chain of four processing elements 710a-710d will align with the outputs 755 of the four processing elements 710a-710d. This allows chains of more than four processing elements to be formed.

In FIG. 7, inputs 751 to the chain of four processing elements 710a-710d are illustrated being provided to the top of the page side of processing element 710a. Processing element 710a provides outputs 752 from the right side of processing element 710a. Processing element 710b is positioned to the right of processing element 710a. The outputs 752 from processing element 710a are received on the left side of processing element 710b. Processing element 710b provides outputs 753 from the bottom side of processing element 710b. Processing element 710c is positioned directly below processing element 710b. The outputs 753 from processing element 710b are received on the top side of processing element 710c. Processing element 710c provides outputs 754 from the left side of processing element 710c. Processing element 710d is positioned to the left of processing element 710c. The outputs 754 from processing element 710c are received on the right side of processing element 710d. Processing element 710d provides outputs 755 from the bottom of the page side of processing element 710d. It can be seen from FIG. 7 that inputs 751 of the chain of four processing elements 710a-710d are received in a location that aligns left to right with the outputs of the chain of four processing elements 710a-710d. Thus, it should be understood that one or more additional chains of four processing elements may either supply inputs 751, receive outputs 755, or both.

As described herein, TSVs 717a-717d may be used by processing elements 710a-710d to access DRAM memory banks on dies (not shown in FIG. 7) that are stacked with the die holding processing elements 710a-710d. This is further described herein with reference to FIG. 8.

Figure 8:
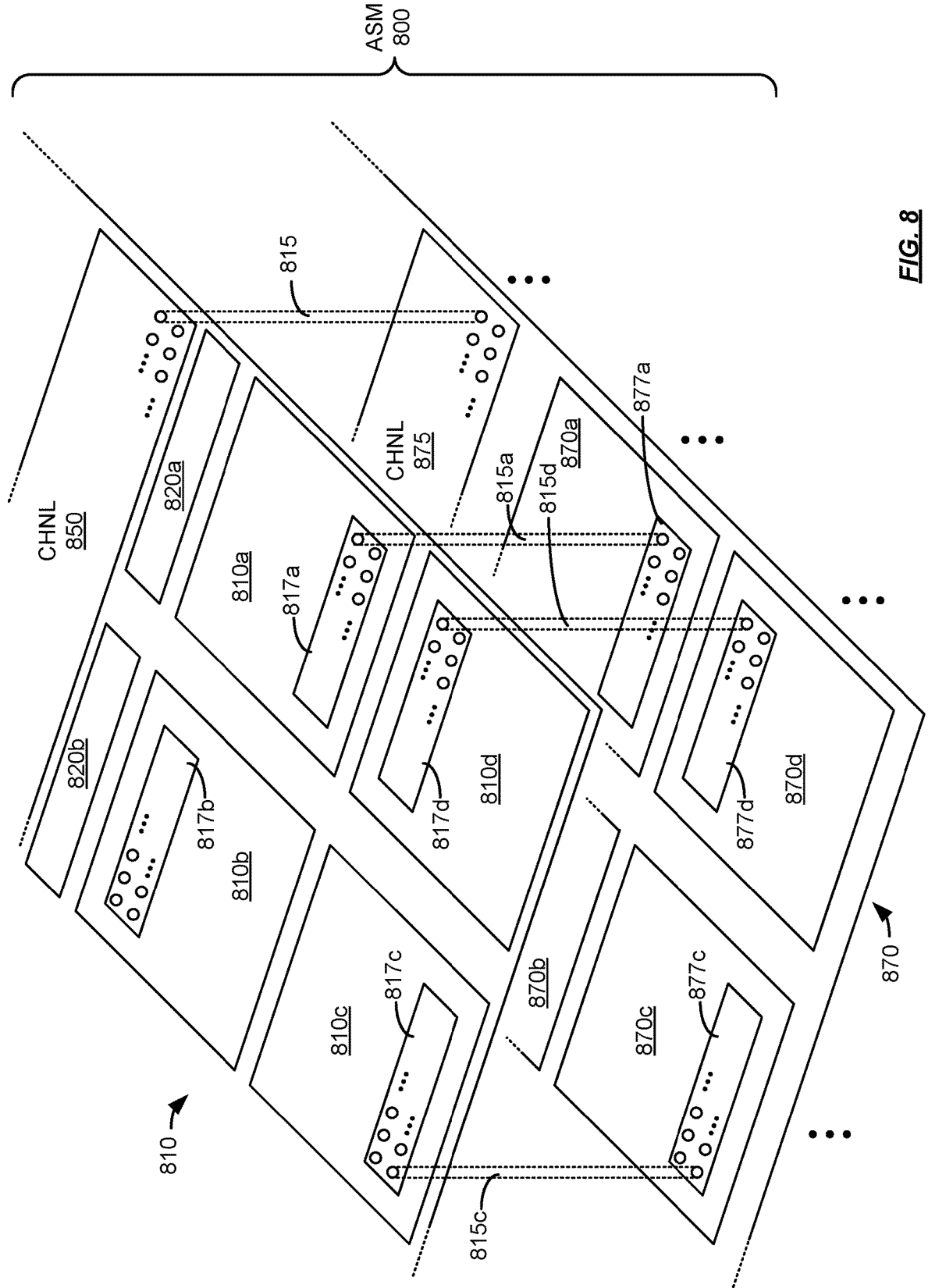
FIG. 8 is an isometric illustration of an example chained processing element die stacking with at least one DRAM die.

FIG. 8 is an isometric, exploded view, illustration of an example chained processing element die stacking with at least one DRAM die. In FIG. 8, assembly 800 includes processing die 810 stacked with at least DRAM die 870. Processing die 810 includes channel connections (e.g., TSVs) 850, staging buffers 820a-820b, and processing elements 810a-810d. Processing elements 810a-810d include and/or are coupled to TSV connections 817a-817d, respectively. In an embodiment, channel connections 850 of processing die 810 are connection compatible with an HBM standard.

DRAM die 870 includes channel connections (e.g., TSVs) 875 and DRAM memory banks 870a-870d. DRAM memory banks 870a, 870c, and 870d include and/or are coupled to TSV connections 877a, 877c, and 877d, respectively. DRAM memory bank 870b also includes and/or is coupled to TSV connections. However, in FIG. 8, these TSV connections are obscured by processing die 810 and are therefore not illustrated in FIG. 8. In an embodiment, channel connections 875 of DRAM die 810 are connection compatible with an HBM standard. TSV connections 817a, 817c, and 817d of processing elements 810a, 810c, and 810d of processing die 810 are aligned with TSV connections 877a, 877c, and 877d of DRAM banks 870a, 870c, and 870d of DRAM die 870, respectively. Likewise, TSV connections 817b of processing element 810b of processing die are aligned with the obscured (in FIG. 8) TSV connections of DRAM bank 870b. Channel connections 850 of processing die 810 are aligned with channel connections 875 of DRAM die 870. Thus, when processing die 810 and DRAM die 870 are stacked with each other, TSV connections 817a-817d of processing elements 810a-810d of processing die 810 are electrically connected to TSV connections (e.g., 877a, 877c, and 877d) of DRAM banks 870a-870d of DRAM die 870. This is illustrated in FIG. 8 by TSV representations 815a, 815c, and 815d. Likewise, channel connections 850 of processing die 810 are electrically connected to with channel connections 875 of DRAM die 870. This is illustrated in FIG. 8 by TSV representation 815.

TSV connections between processing elements 810a-810d and DRAM banks 870a-870d allow processing elements 810a-810d to access DRAM banks 870a-870d. TSV connections between processing elements 810a-810d and DRAM banks 870a-870d allow processing elements 810a-810d to access DRAM banks 870a-870d without the data flowing via channel connections 850 and/or channel connections 875. In addition, TSV connections between processing elements 810a-810d and DRAM banks 870a-870d allow processing elements 810a-810d to access respective DRAM banks 870a-870d independently of each other. Processing elements 810a-810d accessing respective DRAM banks 870a-870d independently of each other allow processing elements 810a-810d to access respective DRAM banks 870a-870d in parallel—thereby providing a high memory-to-processing element bandwidth and lower latency.

A high memory-to-processing element bandwidth helps speed computations performed by neural networks and improves the scalability of neural networks. For example, in some applications, neural network model parameters (weights, biases, learning rate, etc.) should be quickly swapped to a new neural network model (or portion of a model.) Otherwise, more time is spent loading neural network model parameters and/or data than is spent calculating results. This is also known as the "Batch Size=1 Problem". This may be, for example, particularly problematic in data centers and other shared infrastructure.

In an embodiment, the TSV connections between processing elements 810a-810d and DRAM banks 870a-870d of multiple DRAM dies of the stack (not shown in FIG. 8) may be made in a common bus type configuration. In another embodiment, the TSV connections between processing elements 810a-810d and DRAM banks 870a-870d of multiple DRAM dies of the stack (not shown in FIG. 8) may be made in a point-to-point bus type configuration.

Assembly 800 provides (at least) two data paths for large-scale neural network data movement. A first path can be configured to move training and/or inference data to processing element input layers (e.g., when the input layer of a neural network is being implemented on the first element of a processing chain) and move output data from the output layer to storage (e.g., when the output layer of a neural network is being implemented on the last element of a processing chain.) In an embodiment, this first path may be provided by channel connections 850 and 875. The processing chains may be provided by the configuration and interconnection of processing elements 810a-810d, as described herein with reference to at least FIGS. 1A-1D, and FIG. 7.

A second path may be configured to, in parallel, load and/or store neural network model parameters and/or intermediate results to/from multiple processing elements 810a-801d through the TSV interconnections (e.g., 815a, 815c, and 815d.) Because each processing element is loading/storing in parallel with the other processing elements 810a-810d, systolic array elements, for example, may be updated quickly (relative to using the channel connections 850 and 875.)

Figure 9A:
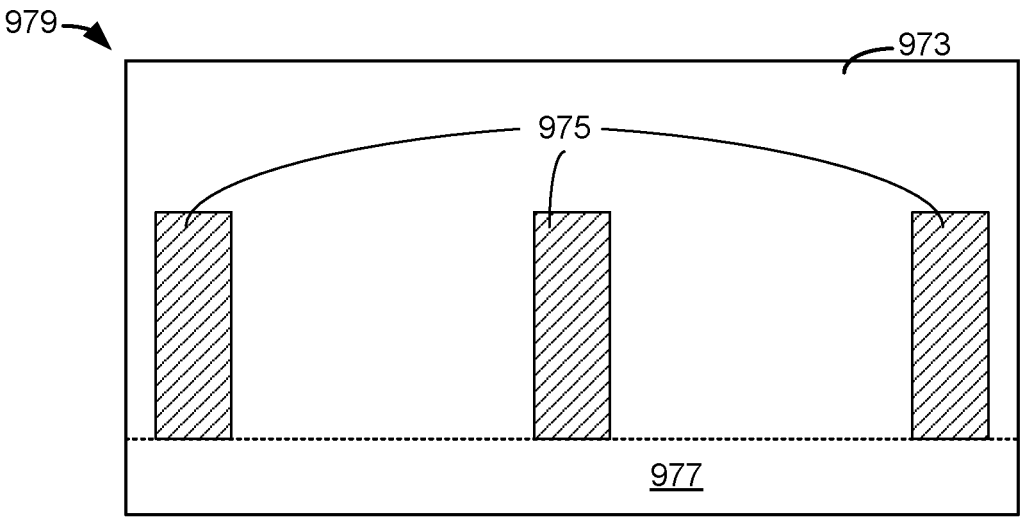
FIGS. 9A-9B illustrate example cross-sections of stackable DRAM dies.

FIGS. 9A-9I illustrate some components and manufacturing steps that may be used to create processing die/DRAM die stacks. FIG. 9A illustrates a first example cross-section of a stackable DRAM die. In FIG. 9A DRAM die 979 includes an active circuit layer 977, TSVs 975, and unthinned bulk silicon 973. In an embodiment, DRAM die 979 may be used as the top die of an HBM stack.

Figure 9B:
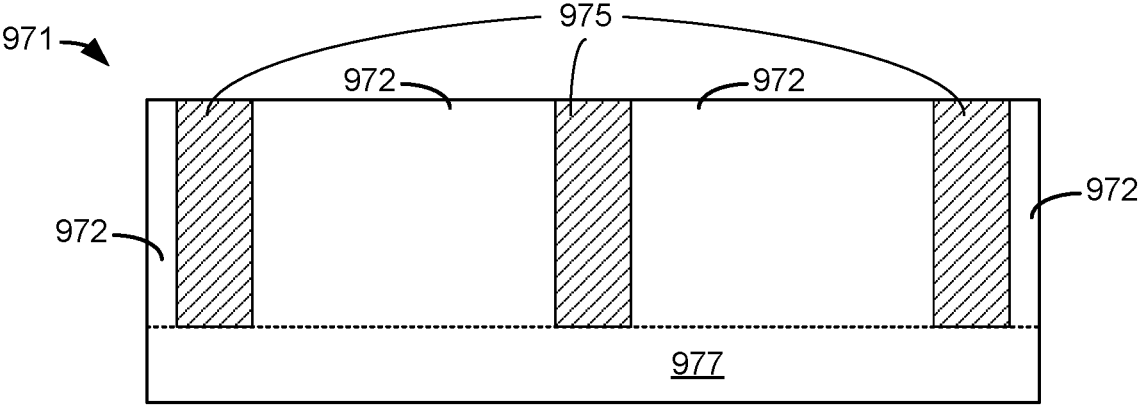

FIG. 9B illustrates a second example cross-section of a stackable DRAM die. In FIG. 9B DRAM die 971 includes an active circuit layer 977, TSVs 975, and bulk silicon 972. Note that die 971 is equivalent to die 979 except for a portion of bulk silicon 973 has been removed (e.g., by thinning until TSVs 975 are exposed on the backside of die 971.)

Figure 9C:
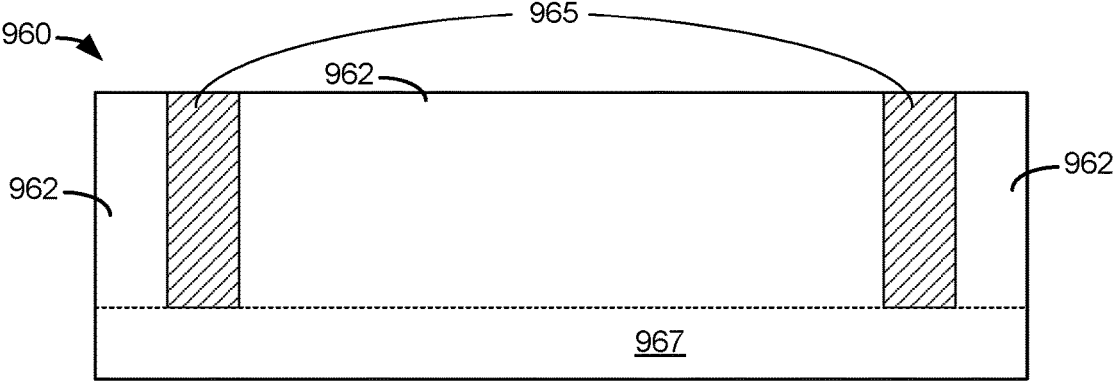
FIG. 9C illustrates an example cross-sections of stackable base die.

FIG. 9C illustrates an example cross-sections of stackable base die. In FIG. 9C base die 960 includes an active circuit layer 967, TSVs 965, and bulk silicon 962. Note that die 960 has been thinned until TSVs 965 are exposed on the backside of die 960.

Figure 9D:
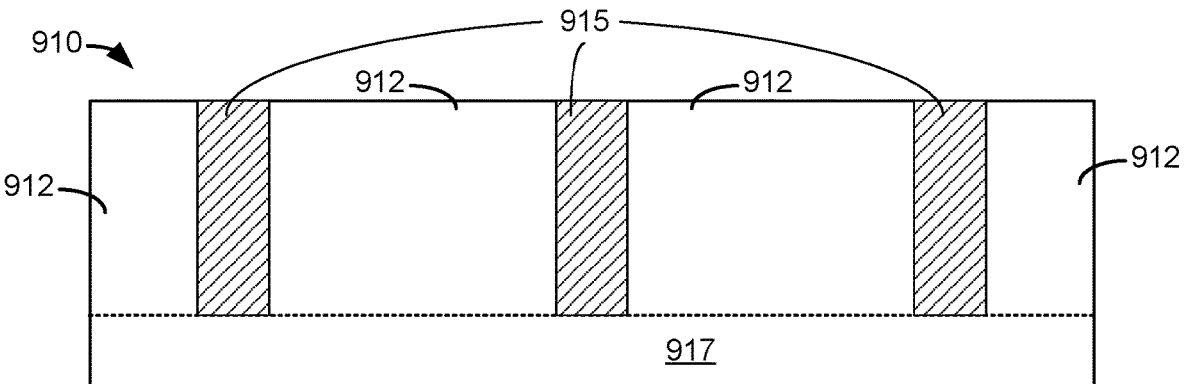
FIG. 9D illustrates an example cross-sections of stackable logic/processing die.

FIG. 9D illustrates an example cross-sections of stackable logic/processing die. In FIG. 9D processing/logic die 910 includes an active circuit layer 917, TSVs 915, and bulk silicon 912. Note that die 910 has been thinned until TSVs 915 are exposed on the backside of die 910.

Figure 9E:
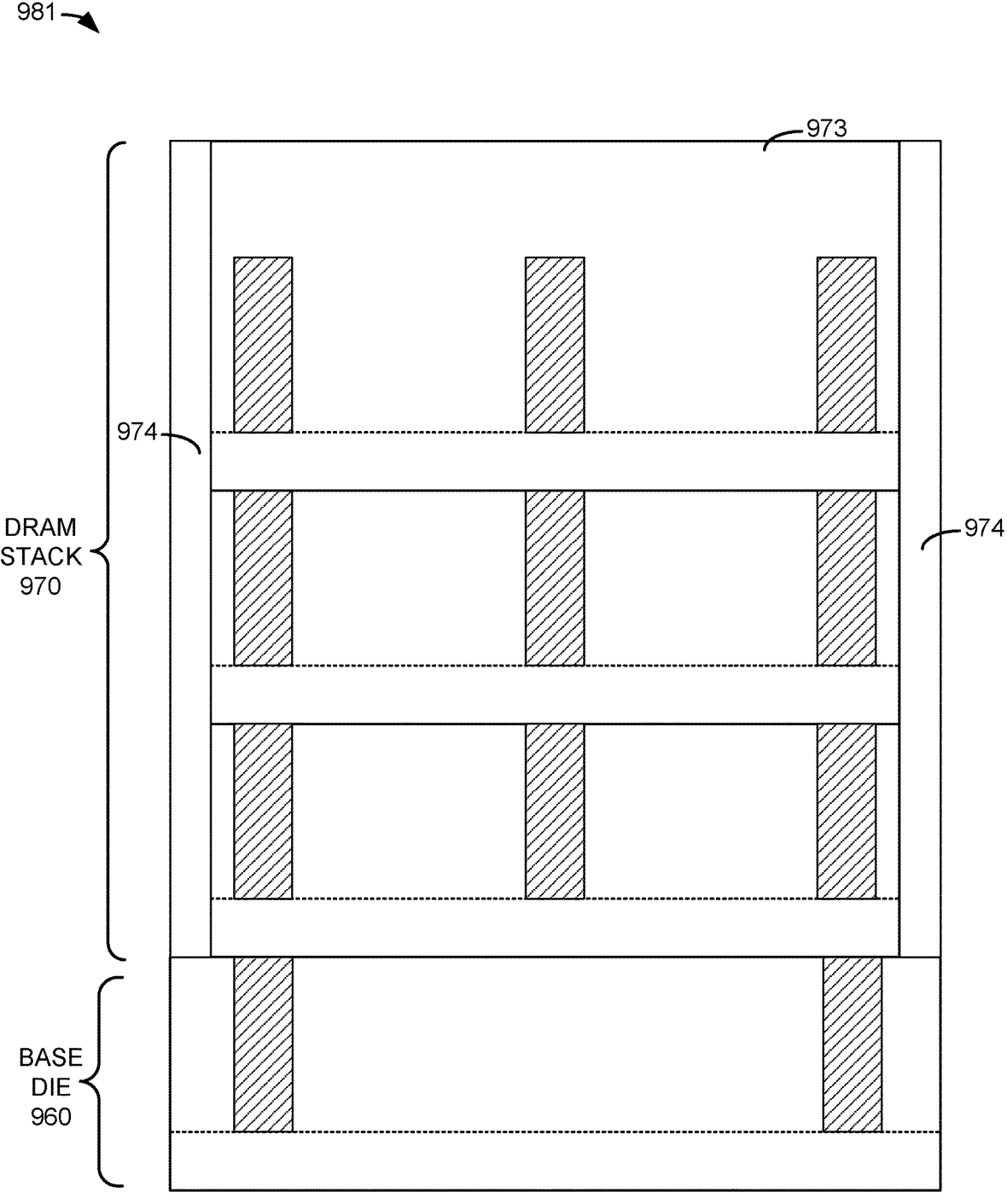
FIG. 9E illustrates an example stacked DRAM assembly.

FIG. 9E illustrates an example stacked DRAM assembly. In FIG. 9E, DRAM assembly 981 (e.g., an HBM compatible assembly) includes base die 960 stacked with DRAM stack

970. DRAM stack 970 includes a plurality of thinned dies (e.g., dies 971) stacked with an unthinned die at the top of the stack (e.g., die 979). A perimeter of support/infill material 974 is also included as a part of assembly 981. It should be understood that assembly 981 may be a standard HBM assembly as shipped from a manufacturer.

Figure 9F:
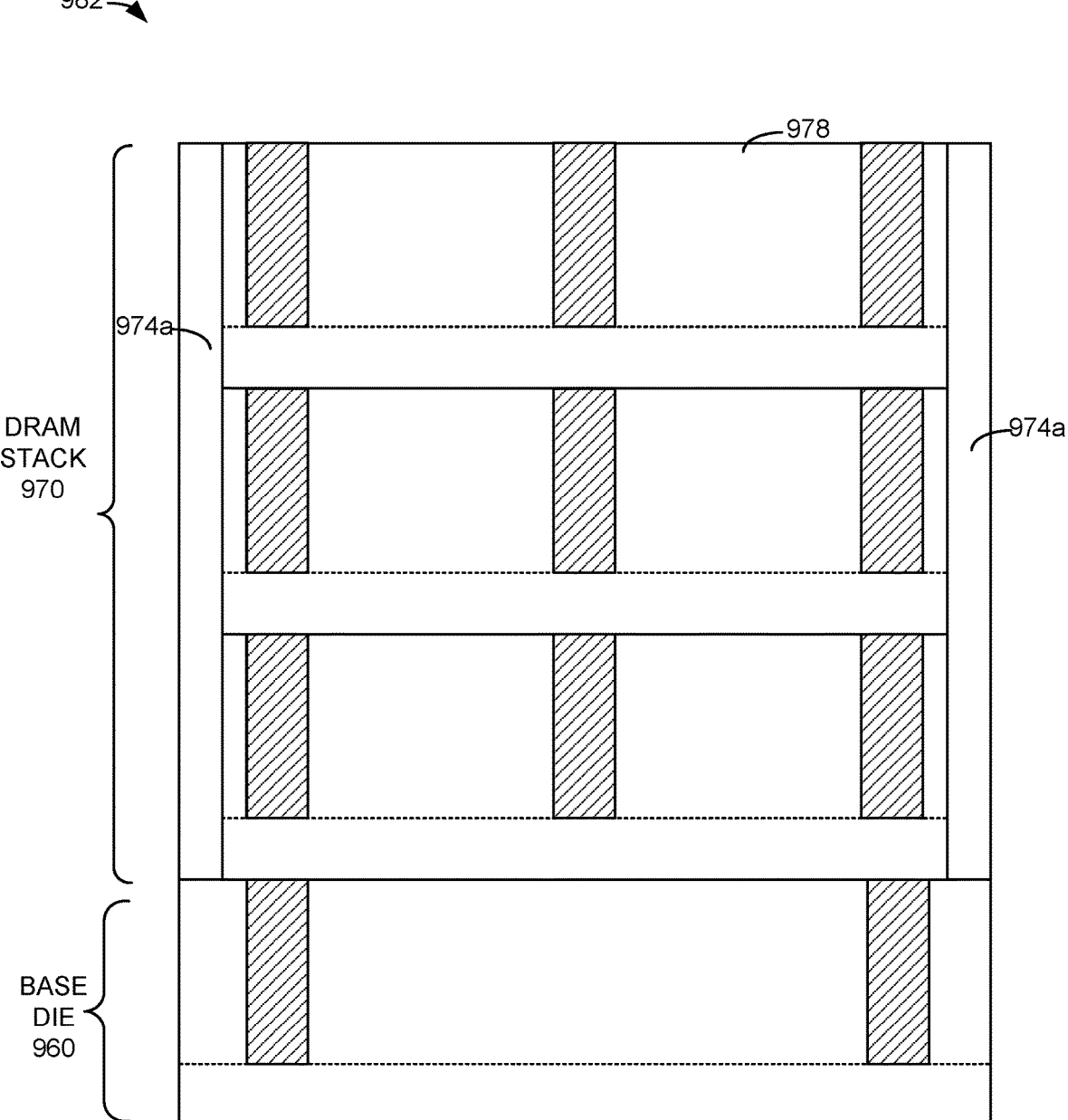
FIG. 9F illustrates a stacked DRAM assembly compatible with an added logic/processing die.

FIG. 9F illustrates a stacked DRAM assembly compatible with an added logic/processing die. In FIG. 9F, DRAM assembly 982 includes base die 960 stacked with DRAM stack 970. DRAM stack 970 includes a plurality of thinned dies (e.g., dies 971). A perimeter of support/infill material 974a is also included as a part of assembly 982. It should be understood that assembly 982 may be a standard HBM assembly (e.g., assembly 981) as shipped from a manufacturer that has had the bulk silicon 973 of an unthinned top die removed (e.g., by thinning.)

Figure 9G:
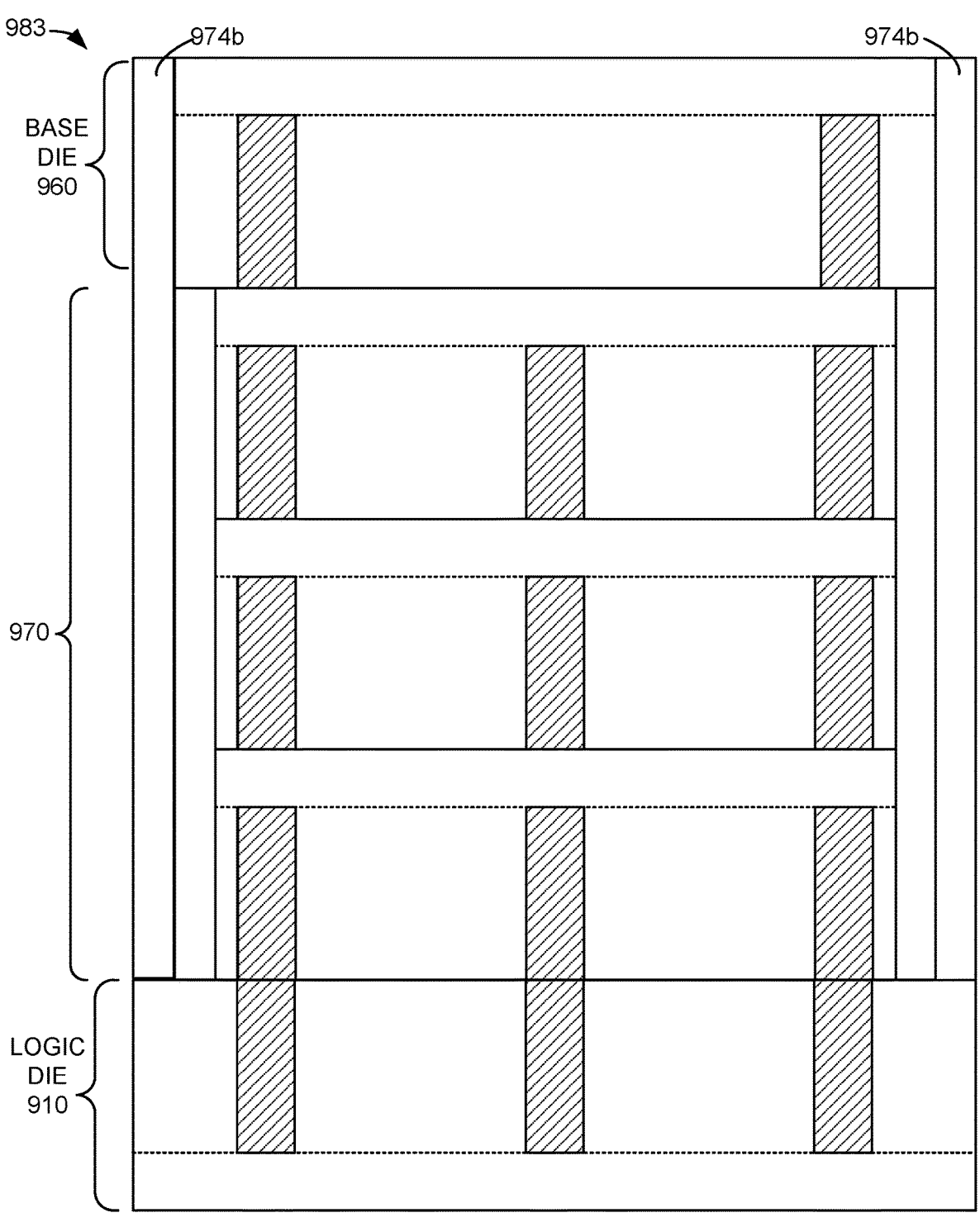
FIG. 9G illustrates a stacked DRAM assembly with an added logic/processing die.

FIG. 9G illustrates a stacked DRAM assembly with an added logic/processing die. In FIG. 9G, DRAM assembly 983 includes base die 960 stacked with DRAM stack 970 and logic die 910. DRAM stack 970 includes a plurality of thinned dies (e.g., dies 971). A perimeter of support/infill material 974b is also included as a part of assembly 983. Logic die 910 is attached (TSV-to-TSV) to the DRAM die in the stack 970 that is opposite end of the assembly from the base die 960. Note that in FIG. 9G, the assembly is illustrated in an inverted orientation from assembly 982 so that logic die 910 appears attached to the bottom DRAM die in FIG. 9G.

Figure 9H:
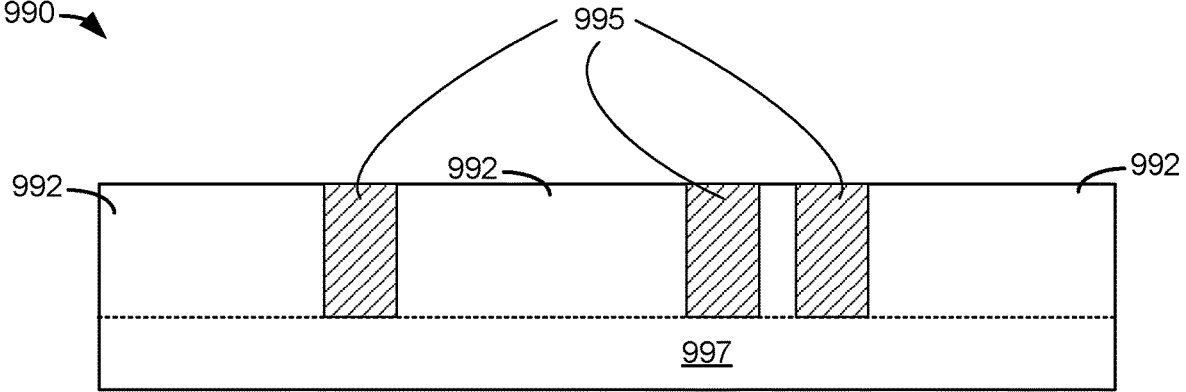
FIG. 9H illustrates an example cross-section of a stackable TSV redistribution die.

FIG. 9H illustrates an example cross-section of a stackable TSV redistribution die. In FIG. 9H base die 990 includes a circuit layer 997, TSVs 995, and bulk silicon 992. In an embodiment, circuit layer 997 does not include active circuits (e.g., powered transistors, etc.) and is thus composed of conductive elements (e.g., metal routing, vias, etc.) Note that die 990 has been thinned until TSVs 995 are exposed on the backside of die 990.

Figure 9I:
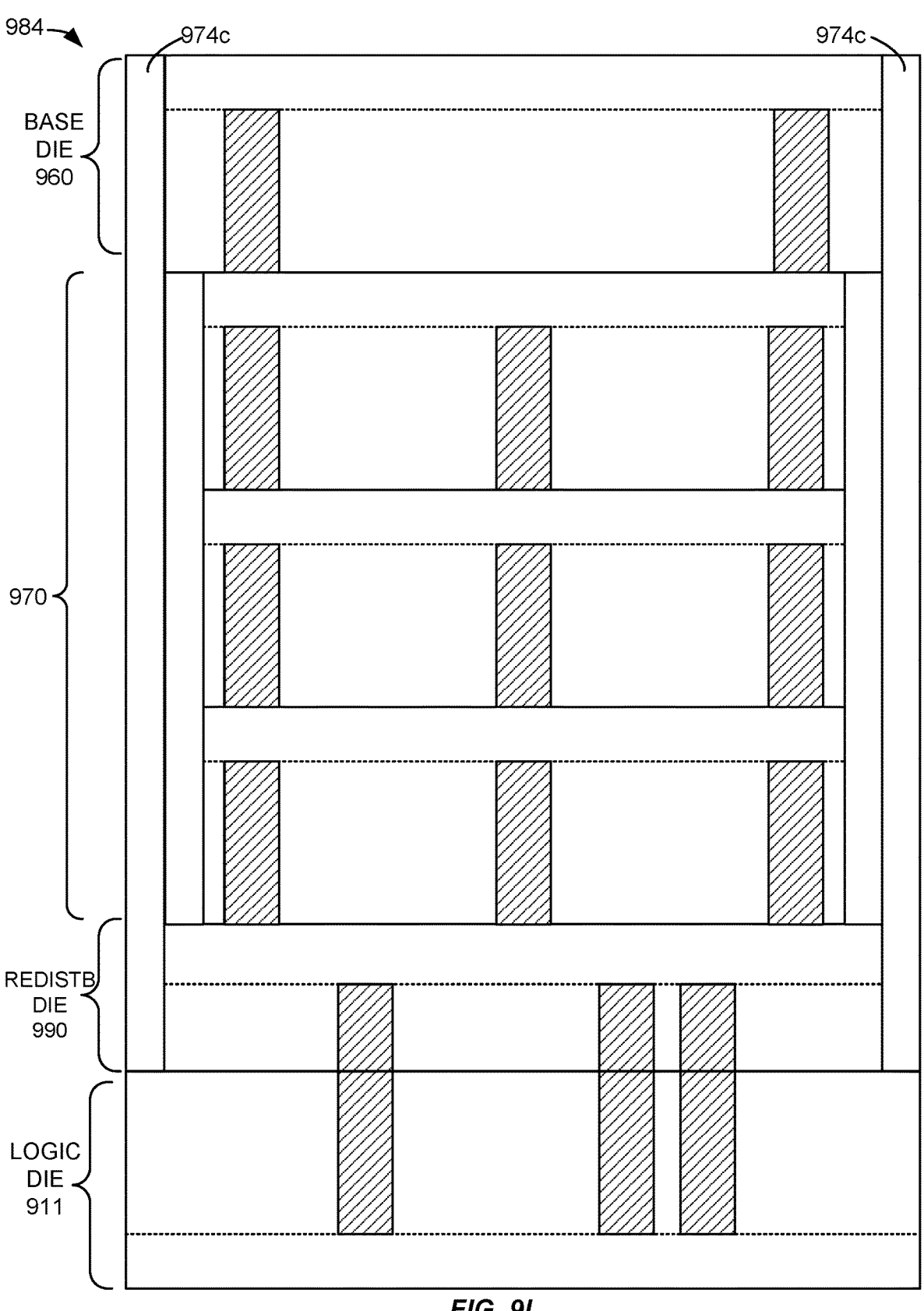
FIG. 9I illustrates a stacked DRAM assembly using a TSV redistribution die to connect logic/processing die TSVs to DRAM die TSVs.

FIG. 9I illustrates a stacked DRAM assembly using a TSV redistribution die to connect logic/processing die TSVs to DRAM die TSVs. In FIG. 9I, DRAM assembly 984 includes base die 960 stacked with DRAM stack 970, redistribution die 990, and logic die 911. The TSVs of logic die 911 do not align with the TSVs of DRAM stack 970. DRAM stack 970 includes a plurality of thinned dies (e.g., dies 971). A perimeter of support/infill material 974c is also included as a part of assembly 982. Logic die 911 is attached (TSV-to-TSV) to redistribution die 990. Redistribution die 990 is attached circuit layer (on die 990) to TSV (on DRAM stack 970). Redistribution die 990 is attached to the DRAM die in the stack that is opposite end of the assembly from the base die 960.

Figure 10:
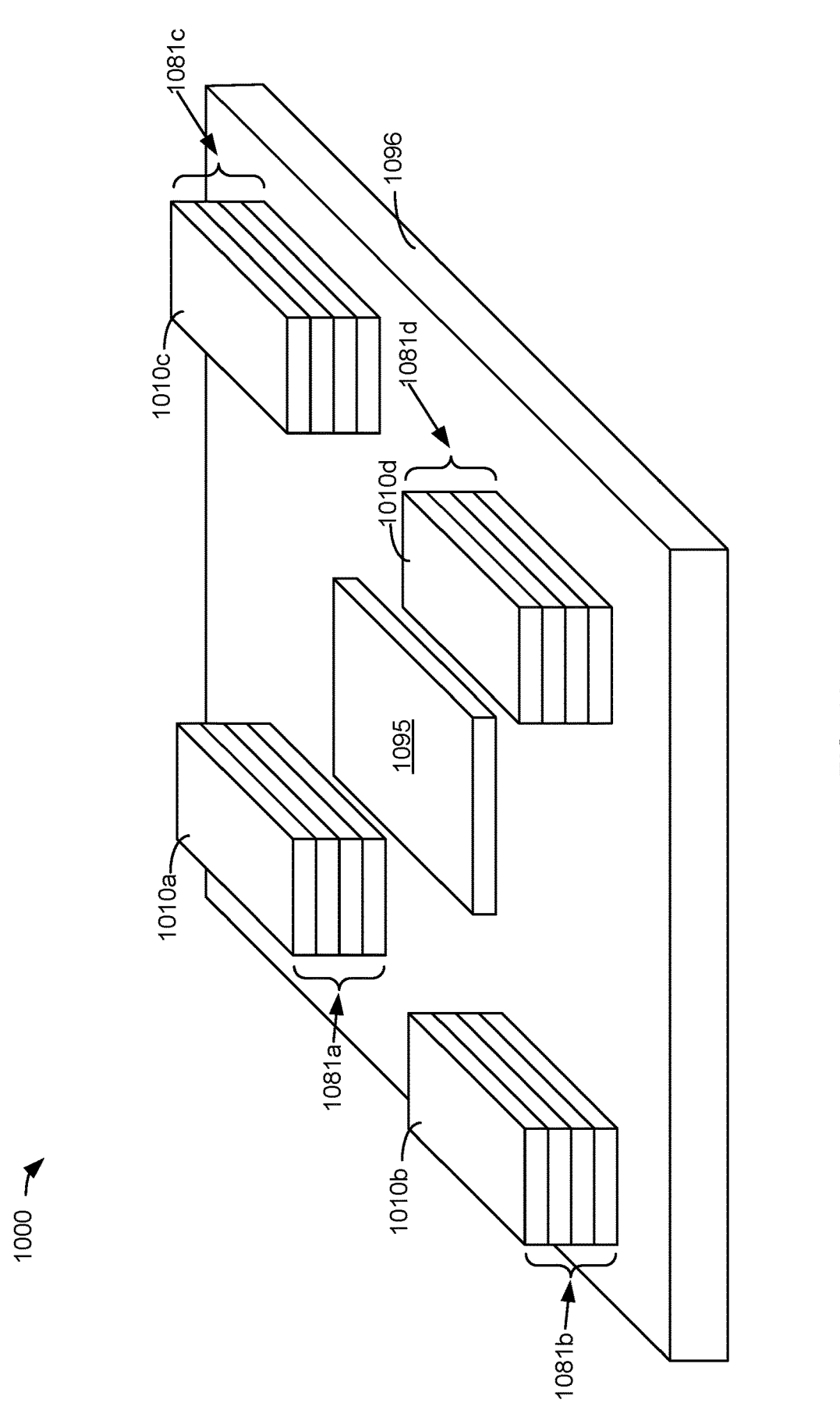
FIG. 10 illustrates an example processing module.

FIG. 10 illustrates an example processing module. In FIG. 10, module 1000 comprises substrate 1096, assemblies 1081a-1081d, and system 1095. In an embodiment, system 1095 is a system-on-a-chip (SoC) that includes at least one processor and/or memory controller. System 1095 is disposed on substrate 1096.

Figure 11A:
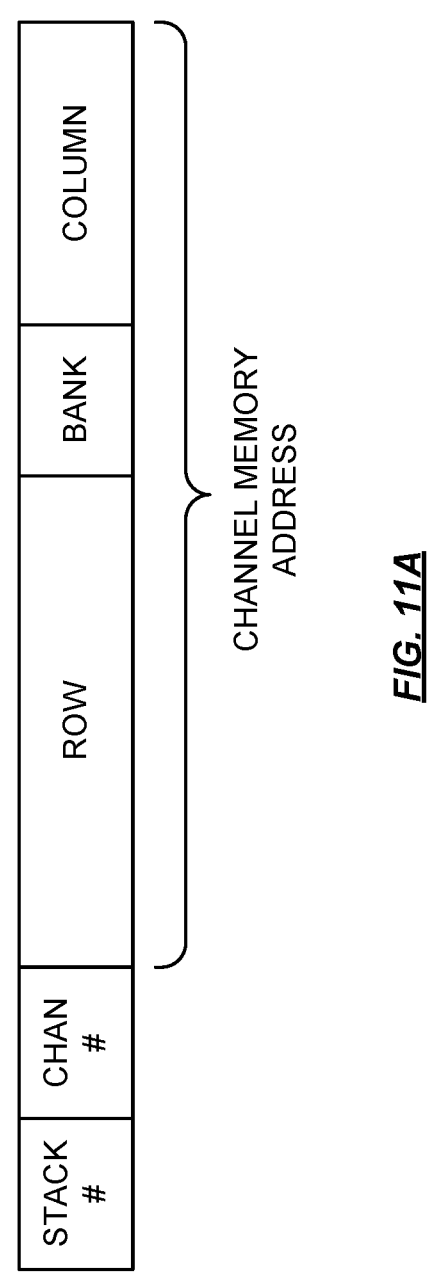
FIGS. 11A-11B illustrates an example assignments of address bits to accommodate processing chains coupled to HBM channels.
Figure 11B:
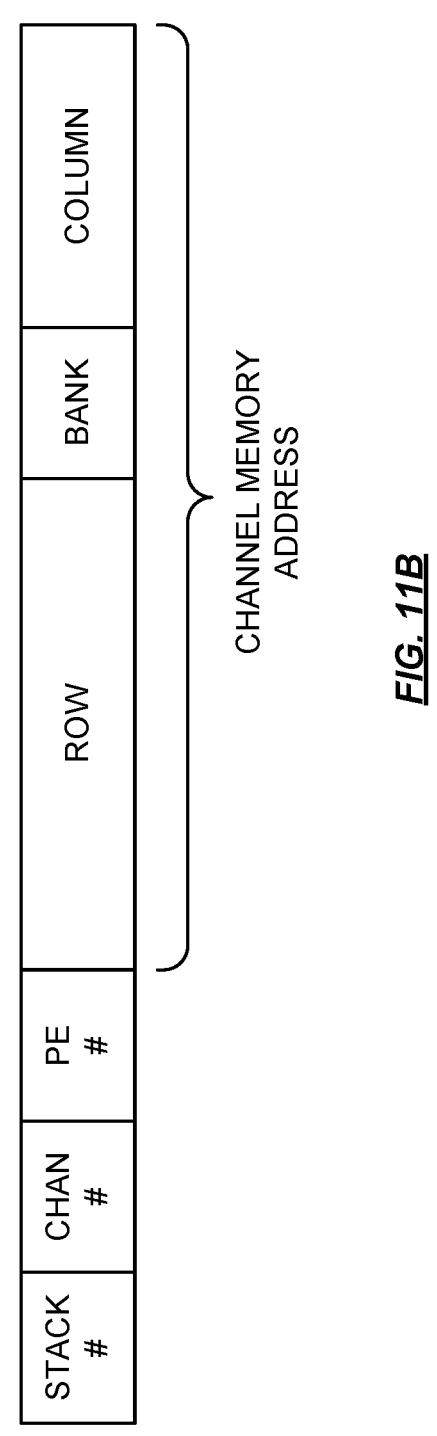

Assemblies 1081a-1081d comprise a stack of DRAM dies and at least one include processing die 1010a-1010d, respectively. Assemblies 1081a-1081d are disposed on substrate 1096. In an embodiment, system 1095 may access assemblies 1081a-1081d using an address scheme that includes fields that indicate which assembly (stack), which channel of the assembly, and which row, bank, and column of that channel are being addressed. This is further illustrated in FIG. 11A. In another embodiment, system 1095 may access assemblies 1081a-1081d using an address scheme that includes fields that indicate which assembly (stack), which channel of the assembly, which processing element on the selected channel, and which row, bank, and column of that channel are being addressed. This is further illustrated in FIG. 11B.

The methods, systems and devices described above may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of processing array 101, processing element 110, processing node 140, processing node 142, processing node 149, die 200, circuitry 300, assembly 401, assembly 402, system 501, system 502, assembly 605, assembly 606*a*, assembly 606*b*, assembly 800, die 910, die 960, die 971, die 979, assembly 981, assembly 982, assembly 983, assembly 984, die 990, module 1000 and their components. These software descriptions may be: behavioral, register transfer, logic component, transistor, and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

Figure 12:
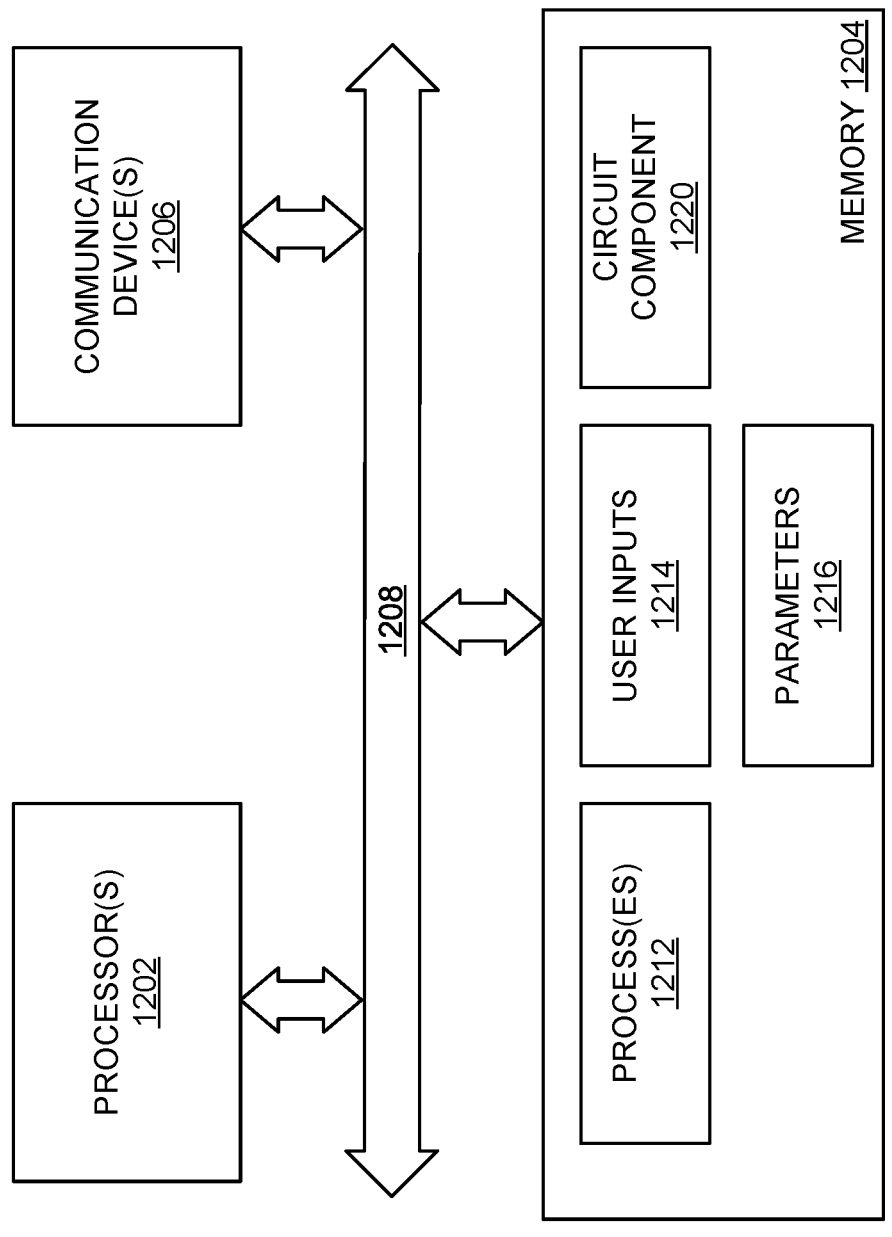
FIG. 12 is a block diagram of a processing system.

FIG. 12 is a block diagram illustrating one embodiment of a processing system 1200 for including, processing, or generating, a representation of a circuit component 1220. Processing system 1200 includes one or more processors 1202, a memory 1204, and one or more communications devices 1206. Processors 1202, memory 1204, and communications devices 1206 communicate using any suitable type, number, and/or configuration of wired and/or wireless connections 1208.

Processors 1202 execute instructions of one or more processes 1212 stored in a memory 1204 to process and/or generate circuit component 1220 responsive to user inputs 1214 and parameters 1216. Processes 1212 may be any suitable electronic design automation (EDA) tool or portion thereof used to design, simulate, analyze, and/or verify electronic circuitry and/or generate photomasks for electronic circuitry. Representation 1220 includes data that describes all or portions of processing array 101, processing element 110, processing node 140, processing node 142, processing node 149, die 200, circuitry 300, assembly 401, assembly 402, system 501, system 502, assembly 605, assembly 606*a*, assembly 606*b*, assembly 800, die 910, die 960, die 971, die 979, assembly 981, assembly 982, assembly 983, assembly 984, die 990, module 1000, and their components, as shown in the Figures.

Representation 1220 may include one or more of behavioral, register transfer, logic component, transistor, and layout geometry-level descriptions. Moreover, representation 1220 may be stored on storage media or communicated by carrier waves.

Data formats in which representation 1220 may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email User inputs 1214 may comprise input parameters from a keyboard, mouse, voice recognition interface, microphone and speakers, graphical display, touch screen, or other type of user interface device. This user interface may be distributed among multiple interface devices. Parameters 1216 may include specifications and/or characteristics that are input to help define representation 1220. For example, parameters 1216 may include information that defines device types (e.g., NFET, PFET, etc.), topology (e.g., block diagrams, circuit descriptions, schematics, etc.), and/or device descriptions (e.g., device properties, device dimensions, power supply voltages, simulation temperatures, simulation models, etc.).

Memory 1204 includes any suitable type, number, and/or configuration of non-transitory computer-readable storage media that stores processes 1212, user inputs 1214, parameters 1216, and circuit component 1220.

Communications devices 1206 include any suitable type, number, and/or configuration of wired and/or wireless devices that transmit information from processing system 1200 to another processing or storage system (not shown) and/or receive information from another processing or storage system (not shown). For example, communications devices 1206 may transmit circuit component 1220 to another system. Communications devices 1206 may receive processes 1212, user inputs 1214, parameters 1216, and/or circuit component 1220 and cause processes 1212, user inputs 1214, parameters 1216, and/or circuit component 1220 to be stored in memory 1204.

Implementations discussed herein include, but are not limited to, the following examples:

Example 1: An integrated circuit, comprising: a set of one or more logic layers to interface to a set of stacked memory devices when the integrated circuit is stacked with the set of stacked memory devices; the set of one or more logic layers comprising: a coupled chain of processing elements, wherein processing elements in the coupled chain are to independently compute partial results as functions of data received, store partial results, and pass partial results directly to a next processing element in the coupled chain of processing elements.

Example 2: The integrated circuit of example 1, wherein the coupled chain of processing elements includes an input processing element to receive data from an input interface to the coupled chain of processing elements.

Example 3: The integrated circuit of example 2, wherein the coupled chain of processing elements includes an output processing element to pass results to an output interface of the coupled chain of processing elements.

Example 4: The integrated circuit of example 3, wherein, a processing system is formed when the integrated circuit is stacked with the set of stacked memory devices.

Example 5: The integrated circuit of example 4, wherein the set of one or more logic layers further comprises: a centrally located region of the integrated circuit that includes global input and output circuitry to interface the processing system and an external processing system.

Example 6: The integrated circuit of example 5, wherein the set of one or more logic layers further comprises: first staging buffers coupled between the global input and output circuitry and the coupled chain of processing elements to communicate data with at least one of the input processing element and the output processing element.

Example 7: The integrated circuit of example 6, wherein the set of one or more logic layers further comprises: a plurality of coupled chains of processing elements and a plurality of staging buffers, respective ones of the plurality of staging buffers coupled between the global input and output circuitry and corresponding ones of the plurality of coupled chains of processing elements to communicate data with at least one of a respective input processing element and a respective output processing element of the corresponding one of the plurality of coupled chains or processing elements.

Example 8: An integrated circuit configured to be attached to, and interface with, a stack of memory devices, the integrated circuit comprising: a first set of processing elements that are connected in a first chain topology, where processing elements in the first chain topology are to independently compute partial results using received data, to store partial results, and to directly pass partial results to a next element in the first chain topology.

Example 9: The integrated circuit of example 8, wherein the first chain topology includes a first input processing element to receive data from a first input interface of the first chain topology.

Example 10: The integrated circuit of example 9, wherein the first chain topology includes a first output processing element to pass results to a first output interface of the first chain topology.

Example 11: The integrated circuit of example 10, wherein the first input processing element and the first output processing element are the same processing element.

Example 12: The integrated circuit of example 10, further comprising: a centrally located region of the integrated circuit that includes global input and output circuitry to interface the stack of memory devices and the integrated circuit with an external processing system.

Example 13: The integrated circuit of example 12, further comprising: first staging buffers coupled between the first input interface, the first output interface, and the global input and output circuitry.

Example 14: The integrated circuit of example 13, further comprising: a second set of processing elements that are connected in a second chain topology, where processing elements in the second chain topology are to independently compute partial results using received data, to store partial results, and to directly pass partial results to a next element in the second chain topology, wherein the second chain topology includes a second input processing element to receive data from a second input interface of the second chain topology and a second output processing element to pass results to a second output interface of the second chain topology; and, second staging buffers coupled between the second input interface, the second output interface, and the global input and output circuitry.

Example 15: A system, comprising: a set of stacked memory devices comprising memory cell circuitry; a set of one or more processing devices electrically coupled to the set of stacked memory devices, the set of processing devices comprising: a first set of at least two processing elements that are connected in a chain topology, where processing elements in the first set are to independently compute partial results using received data, to store partial results, and to directly pass partial results to a next processing element in the chain topology, wherein the first set further includes a first input processing element to receive data from a first input interface to the first set and a first output processing element to pass results to a first output interface of the first set.

Example 16: The system of example 15, wherein the set of processing devices further comprise: a second set of at least two processing elements that are connected in a chain topology, where processing elements in the second set are to independently compute partial results using received data, to store partial results, and to directly pass partial results to a next processing element in the chain topology, wherein the second set further includes a second input processing element to receive data from a second input interface to the second set and a second output processing element to pass results to a second output interface of the second set.

Example 17: The system of example 16, wherein the set of processing devices further comprise: a set of staging buffers connected in a ring topology, a first at least one of the set of staging buffers is coupled to the first input interface to supply data to the first input processing element, a second at least one of the set of staging buffers is coupled to the second input interface to supply data to the second input processing element.

Example 18: The system of example 16, wherein a third at least one of the set of staging buffers is coupled to the first output interface to receive data from the first output processing element, a fourth at least one of the set of staging buffers is coupled to the second output interface to receive data from the second output processing element.

Example 19: The system of example 18, wherein the set of processing devices further comprise: a memory interface coupled to the set of staging buffers and coupleable to an external device that is external to the system, the memory interface to perform operations that access, for the external device, the set of stacked memory devices.

Example 20: The system of example 19, wherein the memory interface is to perform operations that access, for the external device, the set of staging buffers.

Example 21: A system, comprising: a set of stacked memory devices each comprising a plurality of memory arrays, the plurality of memory arrays to be accessed via centrally located global input and output circuitry, each of the plurality of memory arrays to also be accessed, independently of the other of the plurality of memory arrays, via respective array access interfaces; a set of one or more processing devices electrically coupled to, and stacked with, the set of stacked memory devices, each of the set of set of one or more processing devices being connected to at least one array access interface of the set of stacked memory devices, the set of processing devices comprising: a first set of at least two processing elements that are connected in a chain topology, where processing elements in the first set are to independently compute partial results using received data, to store partial results, and to directly pass partial results to a next processing element in the chain topology.

Example 22: The system of example 21, wherein the array access interfaces are connected to respective ones of the set of one or more processing devices using through-silicon vias (TSVs).

Example 23: The system of example 22, wherein the first set further includes a first input processing element to receive data from the global input and output circuitry via a first input interface to the first set and a first output processing element to pass results to the global input and output circuitry via a first output interface of the first set.

Example 24: The system of example 23, wherein the set of processing devices further comprise: a second set of at least two processing elements that are connected in a chain topology, where processing elements in the second set are to independently compute partial results using received data, to store partial results, and to directly pass partial results to a next processing element in the chain topology, wherein the second set further includes a second input processing element to receive data from the global input and output circuitry via a second input interface to the second set and a second output processing element to pass results to the global input and output circuitry via a second output interface of the second set.

Example 25: The system of example 24, wherein the set of processing devices further comprise: a set of staging buffers connected in a ring topology, a first at least one of the set of staging buffers is coupled to the first input interface to supply data to the first input processing element, a second at least one of the set of staging buffers is coupled to the second input interface to supply data to the second input processing element.

Example 26: The system of example 25, wherein a third at least one of the set of staging buffers is coupled to the first output interface to receive data from the first output processing element, a fourth at least one of the set of staging buffers is coupled to the second output interface to receive data from the second output processing element.

Example 27: The system of example 26, wherein the set of processing devices further comprise: a memory interface coupled to the set of staging buffers and coupleable to an external device that is external to the system, the memory interface to perform operations that access, for the external device, the set of stacked memory devices.

Example 28: The system of example 27, wherein the memory interface is to perform operations that access, for the external device, the set of staging buffers.

Example 29: A system, comprising: a set of stacked devices comprising a set of stacked memory devices and at least one logic device; the stacked memory devices comprising a plurality of memory arrays, a first interface addressable to access all of the plurality of memory arrays on a respective memory device, and a plurality of second interfaces that access respective subsets of the plurality of memory arrays of the respective memory device; the logic device comprising: a coupled chain of processing elements, where processing elements in the coupled chain are to independently compute partial results as functions of data received, store partial results, and pass partial results directly to a next processing element in the coupled chain of processing elements, each of the processing elements coupled to at least one of the plurality of second interfaces.

Example 30: The system of example 29, wherein the coupled chain of processing elements includes an input processing element to receive data from an input interface to the coupled chain of processing elements.

Example 31: The system of example 30, wherein the coupled chain of processing elements includes an output processing element to pass results to an output interface of the coupled chain of processing elements.

Example 32: The system of example 31, wherein the logic device further comprises: a centrally located region of the logic device that includes global input and output circuitry to interface the system and an external processing system.

Example 33: The system of example 32, wherein the logic device further comprises: first staging buffers coupled between the global input and output circuitry and the coupled chain of processing elements to communicate data with at least one of the input processing element and the output processing element.

Example 34: The system of example 33, wherein the logic device further comprises: a plurality of coupled chains of processing elements and a plurality of staging buffers, respective ones of the plurality of staging buffers coupled between the global input and output circuitry and corresponding ones of the plurality of coupled chains of processing elements to communicate data with at least one of a respective input processing element and a respective output processing element of the corresponding one of the plurality of coupled chains or processing elements.

Example 35: An assembly, comprising: a stacked plurality of dynamic random access memory (DRAM) devices; at least two logic dies also stacked with the plurality of DRAM devices, a first at least one of the at least two logic dies attached to a one of the top and bottom side of the stacked plurality of DRAM devices the stack, and a second at least one of the at least two logic dies attached to an opposite side of the one of the top and bottom side of the stacked plurality of DRAM devices the stack.

Example 36: The assembly of example 35, wherein the first at least one of the at least two logic dies is attached with an active circuit side of the first at least one of the at least two logic dies facing a non-active circuit side of the stacked plurality of DRAM devices.

Example 37: The assembly of example 36, wherein the second at least one of the at least two logic dies is attached with a non-active circuit side of the second at least one of the at least two logic dies facing a non-active circuit side of the stacked plurality of DRAM devices.

Example 38: The assembly of example 35, wherein the assembly includes a die that redistributes through-silicon via (TSV) locations between the stacked plurality of DRAM devices and a one of the at least two logic dies.

Example 39: The assembly of example 35, wherein the assembly includes a die that redistributes through-silicon via (TSV) locations between the stacked plurality of DRAM devices and at least one of the at least two logic dies.

Example 40: The assembly of example 35, wherein the first at least one of the at least two logic dies is a base die compatible with a high-bandwidth memory assembly.

Example 41: The assembly of example 40, wherein the second at least one of the at least two logic dies includes a compute accelerator.

Example 42: The assembly of example 41, wherein the compute accelerator includes a coupled chain of processing elements, where processing elements in the coupled chain are to independently compute partial results as functions of data received, store partial results, and pass partial results directly to a next processing element in the coupled chain of processing elements.

Example 43: The assembly of example 42, wherein the processing elements in the coupled chain are configured as a systolic array.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An integrated circuit, comprising:
a set of one or more logic layers to interface to a set of stacked memory devices when the integrated circuit is stacked with the set of stacked memory devices; and
the set of one or more logic layers comprising:
 a serially coupled chain of processing elements, wherein:
  respective outputs of processing elements are directly coupled to respective inputs of next processing elements in the serially coupled chain of processing elements; and,
  processing elements in the serially coupled chain are to independently of other processing elements in the serially coupled chain of processing elements compute partial results as functions of data received, store partial results, and pass partial results directly to a next processing element in the serially coupled chain of processing elements.

2. The integrated circuit of claim 1, wherein the serially coupled chain of processing elements includes an input processing element to receive data from an input interface to the serially coupled chain of processing elements.

3. The integrated circuit of claim 2, wherein the serially coupled chain of processing elements includes an output processing element to pass results to an output interface of the serially coupled chain of processing elements.

4. The integrated circuit of claim 3, wherein, a processing system is formed when the integrated circuit is stacked with the set of stacked memory devices.

5. The integrated circuit of claim 4, wherein the set of one or more logic layers further comprises:
 a centrally located region of the integrated circuit that includes global input and output circuitry to interface the processing system and an external processing system.

6. The integrated circuit of claim 5, wherein the set of one or more logic layers further comprises:
 first staging buffers coupled between the global input and output circuitry and the serially coupled chain of processing elements to communicate data with at least one of the input processing element and the output processing element.

7. The integrated circuit of claim 6, wherein the set of one or more logic layers further comprises:
 a plurality of serially coupled chains of processing elements and a plurality of staging buffers, respective ones of the plurality of staging buffers coupled between the global input and output circuitry and corresponding ones of the plurality of serially coupled chains of processing elements to communicate data with at least one of a respective input processing element and a respective output processing element of the corresponding one of the plurality of serially coupled chains of processing elements.

8. An integrated circuit configured to be attached to, and interface with, a stack of memory devices, the integrated circuit comprising:
 a first set of processing elements that are connected in a first serially connected chain topology having respective outputs of the first set of processing elements directly coupled with respective inputs of next processing elements in the serially connected chain topology, where processing elements in the first serially connected chain topology are to, independently of other processing elements in the first serially connected chain topology, compute partial results using received data, to store partial results, and to directly pass partial results to a next processing element in the first serially connected chain topology.

9. The integrated circuit of claim 8, wherein the first serially connected chain topology includes a first input processing element to receive data from a first input interface of the first serially connected chain topology.

10. The integrated circuit of claim 9, wherein the first serially connected chain topology includes a first output processing element to pass results to a first output interface of the first serially connected chain topology.

11. The integrated circuit of claim 10, wherein the first input processing element and the first output processing element are the same processing element.

12. The integrated circuit of claim 10, further comprising:
 a centrally located region of the integrated circuit that includes global input and output circuitry to interface the stack of memory devices and the integrated circuit with an external processing system.

13. The integrated circuit of claim 12, further comprising:
 first staging buffers coupled between the first input interface, the first output interface, and the global input and output circuitry.

14. The integrated circuit of claim 13, further comprising:
 a second set of processing elements that are connected in a second serially connected chain topology, where processing elements in the second serially connected chain topology are to, independently of other processing elements of the second serially connected chain topology, compute partial results using received data, to store partial results, and to directly pass partial results to a next element in the second serially connected chain topology, wherein the second serially connected chain topology includes a second input processing element to receive data from a second input interface of the second serially connected chain topology and a second output processing element to pass results to a second output interface of the second serially connected chain topology; and,
 second staging buffers coupled between the second input interface, the second output interface, and the global input and output circuitry.

15. A system, comprising:
 a set of stacked memory devices comprising memory cell circuitry;
 a set of one or more processing devices electrically coupled to the set of stacked memory devices, the set of processing devices comprising:
  a first set of at least two processing elements that are connected in a serial chain topology having respective outputs of processing elements in the first set directly coupled with respective inputs of next processing elements in the serial chain topology, where processing elements in the first set are to, independently of other of the first set of at least two processing elements, compute partial results using received data, to store partial results, and to directly pass partial results to a next processing element in the serial chain topology, wherein the first set includes a first input processing element to receive data from a first input interface to the first set and a first output processing element to pass results to a first output interface of the first set.

16. The system of claim 15, wherein the set of one or more processing devices further comprise:

a second set of at least two processing elements that are connected in the serial chain topology, where processing elements in the second set are to, independently of other of the second set of at least two processing elements, compute partial results using received data, to store partial results, and to directly pass partial results to a next element in the serial chain topology, wherein the second set includes a second input processing element to receive data from a second input interface to the second set and a second output processing element to pass results to a second output interface of the second set.

17. The system of claim 16, wherein the set of processing devices further comprise:

a set of staging buffers connected in a ring topology, wherein a first at least one of the set of staging buffers is coupled to the first input interface to supply data to the first input processing element, a second at least one of the set of staging buffers is coupled to the second input interface to supply data to the second input processing element.

18. The system of claim 16, wherein a third at least one of the set of staging buffers is coupled to the first output interface to receive data from the first output processing element, a fourth at least one of the set of staging buffers is coupled to the second output interface to receive data from the second output processing element.

19. The system of claim 18, wherein the set of processing devices further comprise:

a memory interface coupled to the set of staging buffers and coupleable to an external device that is external to the system, the memory interface to perform operations that access, for the external device, the set of stacked memory devices.

20. The system of claim 19, wherein the memory interface is to perform operations that access, for the external device, the set of staging buffers.

\* \* \* \* \*